(12) United States Patent
Fujimoto et al.

(10) Patent No.: US 10,173,746 B2
(45) Date of Patent: Jan. 8, 2019

(54) BICYCLE OPERATING DEVICE

(71) Applicant: SHIMANO INC., Sakai (JP)

(72) Inventors: Naoki Fujimoto, Sakai (JP); Kentaro Kosaka, Sakai (JP)

(73) Assignee: SHIMANO INC., Sakai (JP)

( * ) Notice: Subject to any disclaimer, the term of this patent is extended or adjusted under 35 U.S.C. 154(b) by 22 days.

(21) Appl. No.: 15/417,224

(22) Filed: Jan. 27, 2017

(65) Prior Publication Data

US 2018/0215439 A1  Aug. 2, 2018

(51) Int. Cl.
*B62K 23/06* (2006.01)
*B62L 3/02* (2006.01)
*B62M 25/04* (2006.01)

(52) U.S. Cl.
CPC ............ *B62K 23/06* (2013.01); *B62L 3/023* (2013.01); *B62M 25/04* (2013.01)

(58) Field of Classification Search
CPC ..... B62M 25/04; B62M 25/045; B62K 23/06; B62L 3/023
See application file for complete search history.

(56) References Cited

U.S. PATENT DOCUMENTS

| 7,152,497 | B2 * | 12/2006 | Sato | B62K 23/06 |
| | | | | 74/502.2 |
| 8,485,060 | B2 * | 7/2013 | Emura | B62M 25/04 |
| | | | | 74/473.13 |
| 8,695,451 | B2 * | 4/2014 | Miki | B62K 23/06 |
| | | | | 74/502.2 |
| 2014/0174235 | A1 * | 6/2014 | Watarai | B62M 25/04 |
| | | | | 74/473.14 |

* cited by examiner

*Primary Examiner* — Thomas C Diaz
(74) *Attorney, Agent, or Firm* — Mori & Ward, LLP

(57) ABSTRACT

A bicycle operating device comprises a base member and an operating member. The operating member includes an adapter, an operating lever, and an operating shaft. The adapter includes a center cross sectional area and a first cross sectional area. The center cross sectional area is defined on a center cross sectional plane perpendicular to the pivot axis. The first cross sectional area is defined on a first cross sectional plane perpendicular to the pivot axis. The first cross sectional area is offset from the center cross sectional area in a second direction parallel to the pivot axis. The first cross sectional area is larger than the center cross sectional area.

17 Claims, 24 Drawing Sheets

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an operating device.

SUMMARY OF THE INVENTION

In accordance with a first aspect of the present invention, a bicycle operating device comprises a base member and an operating member. The operating member includes an adapter, an operating lever, and an operating shaft. The adapter is pivotally coupled to the base member about one of a pivot axis and an additional pivot axis non-parallel to the pivot axis. The operating lever is pivotally coupled to the adapter about the other of the pivot axis and the additional pivot axis. The operating shaft is pivotally coupling the operating lever to the adapter about the additional pivot axis. The operating shaft includes a first shaft end and a second shaft end. The operating shaft extends between the first shaft end and the second shaft end in a first direction parallel to the additional pivot axis. A first perpendicular plane is perpendicular to the additional pivot axis and defined at the first shaft end. A second perpendicular plane is perpendicular to the additional pivot axis and defined at the second shaft end. The adapter includes a center cross sectional area and a first cross sectional area. The center cross sectional area is defined on a center cross sectional plane perpendicular to the pivot axis. The center cross sectional plane is defined on the additional pivot axis when viewed in the first direction. The center cross sectional area is defined between the first perpendicular plane and the second perpendicular plane in the first direction. The first cross sectional area is defined on a first cross sectional plane perpendicular to the pivot axis. The first cross sectional area is offset from the center cross sectional area in a second direction parallel to the pivot axis. The first cross sectional area is defined between the first perpendicular plane and the second perpendicular plane in the first direction. The first cross sectional area is larger than the center cross sectional area.

With the bicycle operating device according to the first aspect, it is possible to make a volume of the adapter around the center cross sectional plane smaller than a volume of the adapter around the first cross sectional plane. Thus, it is possible to create a space around the adapter on and/or adjacent to the center cross sectional plane. This improves design freedom of the bicycle operating device.

In accordance with a second aspect of the present invention, the bicycle operating device according to the first aspect is configured so that the first direction is perpendicular to the second direction.

With the bicycle operating device according to the second aspect, it is possible to further improve design freedom of the bicycle operating device.

In accordance with a third aspect of the present invention, the bicycle operating device according to the first or second aspect is configured so that the base member includes a cylinder bore. The cylinder bore at least partly overlaps with the operating shaft when viewed in a third direction perpendicular to each of the first direction and the second direction.

With the bicycle operating device according to the third aspect, it is possible to utilize the space to arrange the cylinder bore and/or a part defining the cylinder bore.

In accordance with a fourth aspect of the present invention, the bicycle operating device according to the first or second aspect is configured so that the base member includes a cylinder bore and a reservoir bore. At least one of the cylinder bore and the reservoir bore at least partly overlaps with the operating shaft when viewed in a third direction perpendicular to each of the first direction and the second direction.

With the bicycle operating device according to the fourth aspect, it is possible to utilize the space to arrange the cylinder bore and/or a part defining the cylinder bore.

In accordance with a fifth aspect of the present invention, the bicycle operating device according to any one of the first to fourth aspects is configured so that the adapter includes a first coupling part, a second coupling part, and an adapter body. The first coupling part includes a first hole. The operating shaft extends through the first hole. The second coupling part includes a second hole. The second coupling part is spaced apart from the first coupling part. The operating shaft extends through the second hole. The adapter body couples the first coupling part to the second coupling part. The adapter body includes the first cross sectional area.

With the bicycle operating device according to the fifth aspect, this arrangement of the adapter body makes the space larger.

In accordance with a sixth aspect of the present invention, the bicycle operating device according to the fifth aspect is configured so that the adapter body extends in the first direction.

With the bicycle operating device according to the sixth aspect, it is possible to increase a distance between the first coupling part and the second coupling part. it is possible to certainly support the operating lever to pivot relative to the adapter about the additional pivot axis.

In accordance with a seventh aspect of the present invention, the bicycle operating device according to the fifth or sixth aspect is configured so that the first coupling part extends from the adapter body in the second direction.

With the bicycle operating device according to the seventh aspect, it is possible to make the space larger.

In accordance with an eighth aspect of the present invention, the bicycle operating device according to any one of the fifth to seventh aspects is configured so that the second coupling part extends from the adapter body in the second direction.

With the bicycle operating device according to the eighth aspect, it is possible to make the space larger with certainly supporting the operating lever.

In accordance with a ninth aspect of the present invention, the bicycle operating device according to any one of the fifth to eighth aspects is configured so that at least one of the first coupling part and the second coupling part is provided between the first perpendicular plane and the second perpendicular plane.

With the bicycle operating device according to the ninth aspect, this arrangement of the first coupling part and/or the second coupling part make the adapter smaller in the first direction.

In accordance with a tenth aspect of the present invention, the bicycle operating device according to any one of the fifth to ninth aspects is configured so that the operating lever includes a first lever end provided between the first coupling part and the second coupling part.

With the bicycle operating device according to the tenth aspect, it is possible to certainly support the operating lever to pivot relative to the adapter about the additional pivot axis.

In accordance with an eleventh aspect of the present invention, the bicycle operating device according to the fifth aspect is configured so that the adapter body is offset from the additional pivot axis without overlapping with the additional pivot axis when viewed in a third direction perpendicular to each of the first direction and the second direction.

With the bicycle operating device according to the eleventh aspect, it is possible to make the spacer larger.

In accordance with a twelfth aspect of the present invention, the bicycle operating device according to any one of the first to tenth aspects is configured so that the adapter is integrally provided as a one-piece unitary member.

With the bicycle operating device according to the twelfth aspect, it is possible to improve rigidity of the adapter.

In accordance with a thirteenth aspect of the present invention, the bicycle operating device according to the first aspect is configured so that the base member includes a first end portion and a second end portion. The first end portion is configured to be coupled to a bicycle handlebar in a mounting state where the bicycle operating device is mounted to the bicycle handlebar. The second end portion is opposite to the first end portion. The operating member is provided between the first end portion and the second end portion.

With the bicycle operating device according to the thirteenth aspect, it is possible to improve the design freedom of the bicycle operating device in a case where the bicycle operating device is a road-bike operating device.

In accordance with a fourteenth aspect of the present invention, the bicycle operating device according to the thirteenth aspect is configured so that the first end portion includes a mounting surface having a curved shape corresponding to a drop-down handlebar.

With the bicycle operating device according to the fourteenth aspect, it is possible to improve the design freedom of the bicycle operating device in a case where the bicycle operating device is a road-bike operating device.

In accordance with a fifteenth aspect of the present invention, the bicycle operating device according to the thirteenth or fourteenth aspects is configured so that the base member includes a grip portion arranged between the first end portion and the second end portion.

With the bicycle operating device according to the fifteenth aspect, it is possible to improve the design freedom of the bicycle operating device in a case where the bicycle operating device is a road-bike operating device.

In accordance with a sixteenth aspect of the present invention, the bicycle operating device according to any one of the thirteenth to fifteenth aspects is configured so that the second end portion includes a pommel portion.

With the bicycle operating device according to the sixteenth aspect, it is possible to improve the design freedom of the bicycle operating device in a case where the bicycle operating device is a road-bike operating device.

In accordance with a seventeenth aspect of the present invention, a bicycle operating device comprises a base member and an operating member. The operating member includes an adapter and an operating member. The adapter is pivotally coupled to the base member about one of a pivot axis and an additional pivot axis non-parallel to the pivot axis. The operating lever is pivotally coupled to the adapter about the other of the pivot axis and the additional pivot axis. The adapter includes a first projected area and a second projected area. The first projected area is provided on a first side relative to a reference plane when viewed in a reference direction perpendicular to each of the pivot axis and the additional pivot axis. The reference plane is defined to be perpendicular to the pivot axis and to coincide with the additional pivot axis when viewed in the reference direction. The second projected area is provided on a second side relative to the reference plane when viewed in the reference direction. The second side is opposite to the first side relative to the reference plane when viewed in the reference direction. The first projected area is larger than the second projected area.

With the bicycle operating device according to the seventeenth aspect, it is possible to make a volume of the adapter around the reference plane smaller than a volume of the adapter around the first cross sectional plane. Thus, it is possible to create a space around the adapter on and/or adjacent to the reference plane. This improves design freedom of the bicycle operating device.

In accordance with an eighteenth aspect of the present invention, the bicycle operating device according to the seventeenth aspect is configured so that the adapter includes a first coupling part, a second coupling part, and an adapter body. The second coupling part is spaced apart from the first coupling part in a first direction parallel to the additional pivot axis. The adapter body couples the first coupling part to the second coupling part. The adapter body is provided on the first side relative to the reference plane when viewed in the reference direction.

With the bicycle operating device according to the eighteenth aspect, it is possible to make the space larger.

In accordance with a nineteenth aspect of the present invention, the bicycle operating device according to the eighteenth aspect is configured so that at least one of the first coupling part and the second coupling part extends from the first side to the second side beyond the reference plane when viewed in the reference direction.

With the bicycle operating device according to the nineteenth aspect, it is possible to further make the space larger.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
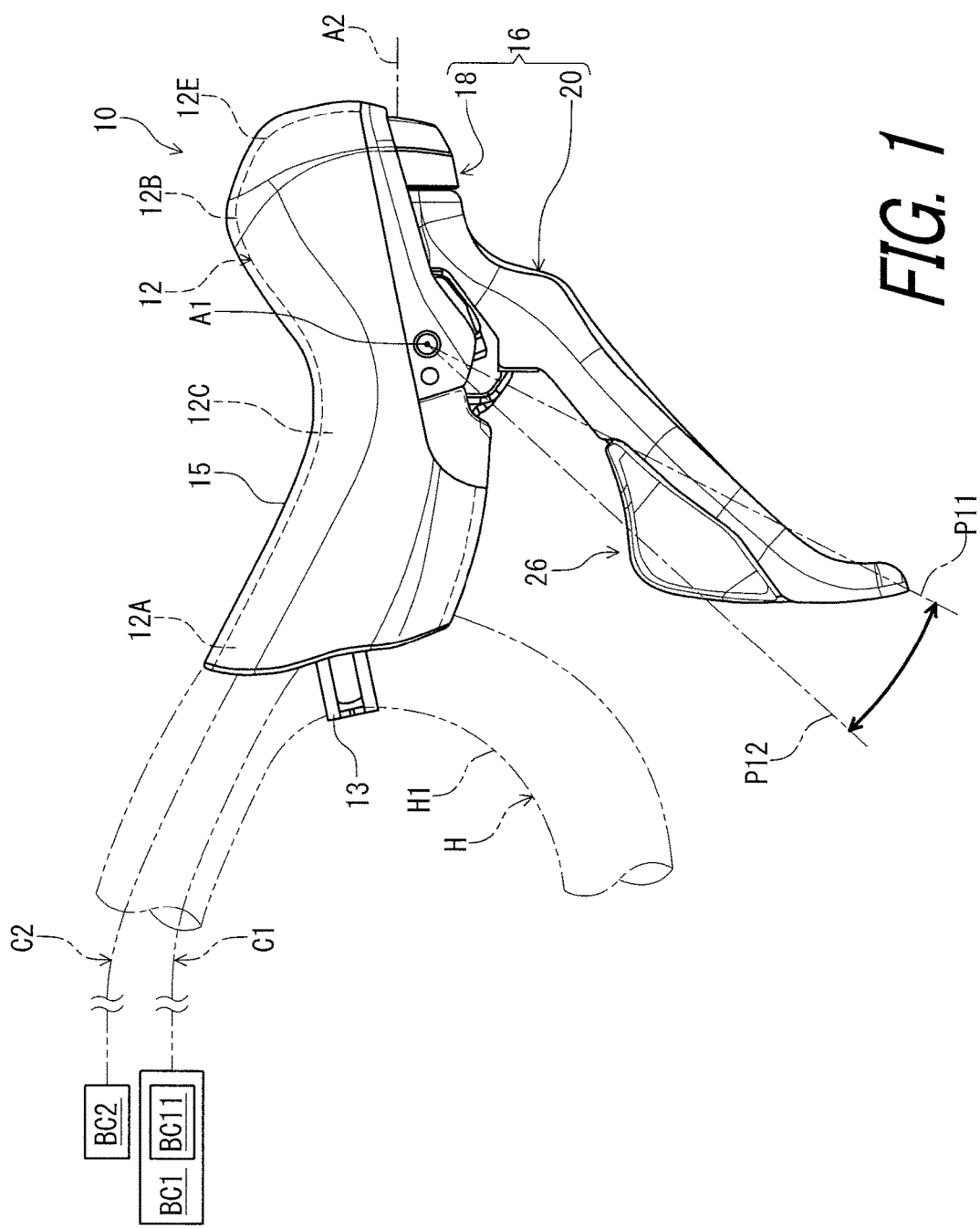
FIG. 1 is a right side elevational view of a bicycle operating device in accordance with an embodiment.

The embodiment(s) will now be described with reference to the accompanying drawings, wherein like reference numerals designate corresponding or identical elements throughout the various drawings.

Referring initially to FIG. 1, a bicycle operating device 10 in accordance with an embodiment is configured to be mounted to a bicycle handlebar H. In this embodiment, the bicycle operating device 10 is configured to be mounted to a drop-down handlebar. However, structures of the bicycle operating device 10 can be applied to other type of handlebars such as a flat handlebar, a time trial handlebar, and a bull horn handlebar. The bicycle handlebar H can also be referred to as the drop-down handlebar H. Furthermore, the bicycle operating device 10 can be mounted to parts other than the bicycle handlebar H in the bicycle. Since structures of the bicycle have been known in the bicycle field, they will not be described in detail here for the sake of brevity.

The bicycle operating device 10 is operatively coupled to a bicycle component BC1. In this embodiment, the bicycle operating device 10 is operatively coupled to the bicycle component BC1 with a control cable C1. Examples of the bicycle component BC1 include a shift device, an adjustable seatpost assembly, and a bicycle suspension. Examples of the control cable C1 include a Bowden cable. In this embodiment, the bicycle component BC1 includes a shift device BC11 configured to change a gear position.

Furthermore, the bicycle operating device 10 is operatively coupled to an additional bicycle component BC2 such as a hydraulic bicycle brake. In this embodiment, the bicycle operating device 10 is operatively coupled to the additional bicycle component BC2 with a hydraulic hose C2. However, the additional bicycle component BC2 can be a bicycle component other than the hydraulic bicycle brake. The additional bicycle component BC2 can be omitted from the bicycle operating device 10.

In this embodiment, the bicycle operating device 10 is a right-hand side control device configured to be operated by the rider's right hand to actuate the additional bicycle component BC2 and the bicycle component BC1. However, the structures of the bicycle operating device 10 can be applied to a left-hand side control device.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing the bicycle handlebar H. Accordingly, these terms, as utilized to describe the bicycle operating device 10, should be interpreted relative to the bicycle equipped with the bicycle operating device 10 as used in an upright riding position on a horizontal surface.

As seen in FIG. 1, the bicycle operating device 10 comprises a base member 12. The base member 12 is configured to be mounted to the bicycle handlebar H. However, the base member 12 can be mounted to parts other than the bicycle handlebar H in a bicycle. The base member 12 includes a first end portion 12A, a second end portion 12B, and a grip portion 12C. The first end portion 12A is configured to be coupled to the bicycle handlebar H in a mounting state where the bicycle operating device 10 is mounted to the bicycle handlebar H. The second end portion 12B is opposite to the first end portion 12A. The grip portion 12C is arranged between the first end portion 12A and the second end portion 12B.

The drop-down handlebar H includes a curved part H1. The second end portion 12B is configured to be coupled to the curved part H1 in a mounting state where the bicycle operating device 10 is mounted to the bicycle handlebar H. The bicycle operating device 10 comprises a mounting clamp 13 to couple the base member 12 to the bicycle handlebar H.

Figure 2:
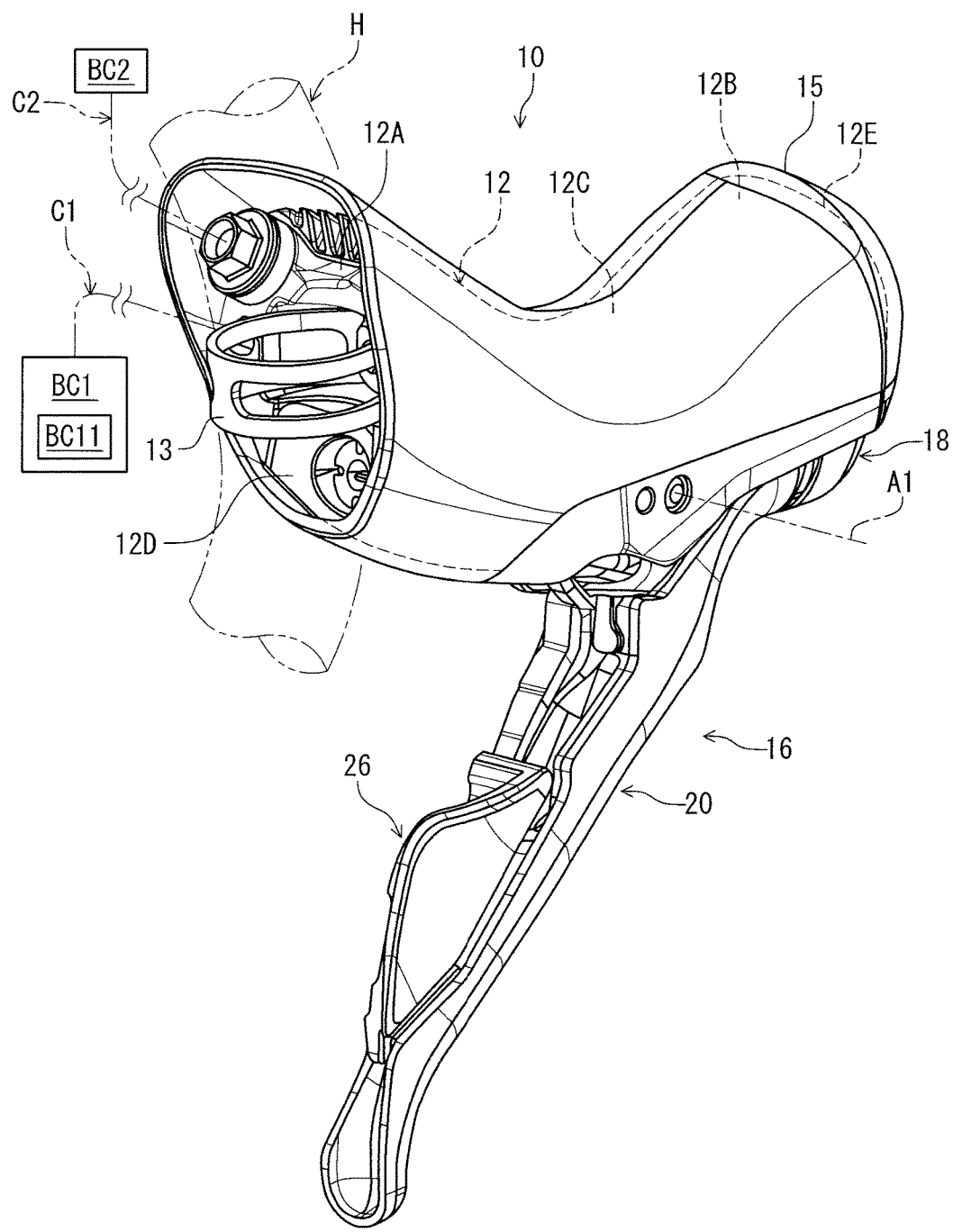
FIG. 2 is a perspective view of the bicycle operating device illustrated in FIG. 1.

As seen in FIG. 2, the first end portion 12A includes a mounting surface 12D having a curved shape corresponding to the drop-down handlebar H. Specifically, the mounting surface 12D has the curved shape corresponding to an outer peripheral surface of the curved part H1.

As seen in FIGS. 1 and 2, the second end portion 12B includes a pommel portion 12E. The pommel portion 12E extends obliquely upward from the grip portion 12C. The pommel portion 12E is disposed above the second end portion 12B in the mounting state of the bicycle operating device 10. The pommel portion 12E can also be configured to be graspable if needed and/or desired.

In this embodiment, the bicycle operating device 10 further comprises a grip cover 15 attached to the base member 12 to at least partly cover the base member 12. The grip cover 15 is at least partly made of an elastic material such as rubber.

As seen in FIG. 1, the bicycle operating device 10 comprises an operating member 16. The operating member 16 is pivotally coupled to the base member 12 about a pivot axis A1. The operating member 16 is provided between the first end portion 12A and the second end portion 12B. The operating member 16 extends downward from the base member 12 in the mounting state of the bicycle operating device 10. The operating member 16 is pivotable relative to the base member 12 between a rest position P11 and an operated position P12. In this embodiment, the operating member 16 is provided as a brake operating lever pivotable about the pivot axis A1. However, the operating member 16 is not limited to the brake operating lever.

In the present application, the term "rest position" as used herein refers to a position at which a movable part such as the operating member 16 remains stationary in a state where the movable part is not operated by the user. The term "operated position" as used herein refers to a position at which the movable part has been operated by the user to perform the operation of the bicycle component.

Figure 3:
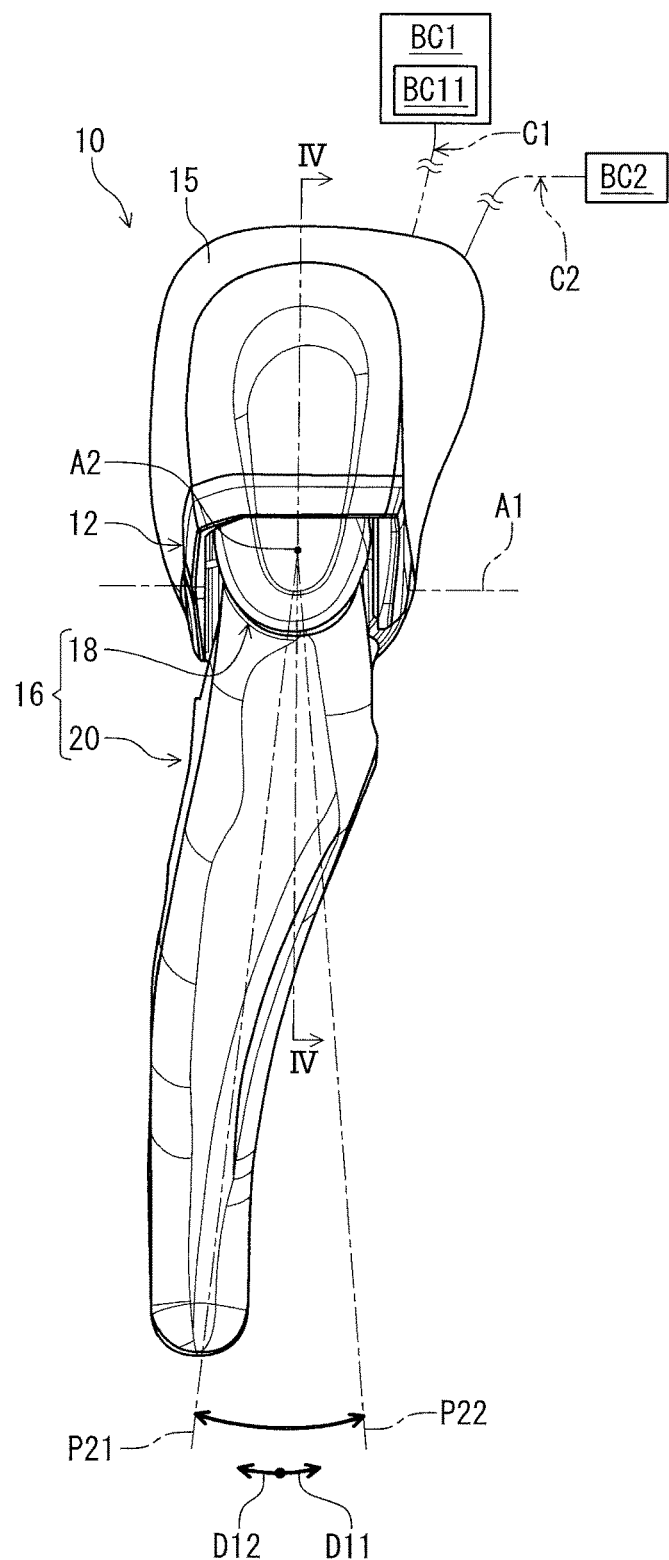
FIG. 3 is a front view of the bicycle operating device illustrated in FIG. 1.

As seen in FIG. 3, the operating member 16 is pivotable relative to the base member 12 about an additional pivot axis A2. The operating member 16 is pivotable relative to the base member 12 between a first rest position P21 and a first operated position P22. The operating member 16 is pivoted relative to the base member 12 from the first rest position P21 to the first operated position P22 in a first operating direction D11. The operating member 16 is pivoted relative to the base member 12 from the first operated position P22 toward the first rest position P21 in a first release direction D12 opposite to the first operating direction D11. The first operating direction D11 and the first release direction D12 are defined along a circumferential direction defined about the additional pivot axis A2. In this embodiment, the operating member 16 is provided as a shift lever pivotable about the additional pivot axis A2. However, the operating member 16 is not limited to the shift lever.

As seen in FIGS. 1 and 3, the operating member 16 includes an adapter 18 and an operating lever 20. The adapter 18 is pivotally coupled to the base member 12 about one of the pivot axis A1 and the additional pivot axis A2 non-parallel to the pivot axis A1. The operating lever 20 is pivotally coupled to the adapter 18 about the other of the pivot axis A1 and the additional pivot axis A2. In this embodiment, the adapter 18 is pivotally coupled to the base member 12 about the pivot axis A1. The operating lever 20 is pivotally coupled to the adapter 18 about the additional pivot axis A2. Namely, the operating lever 20 is pivotally coupled to the base member 12 about each of the pivot axis A1 and the additional pivot axis A2. However, the adapter 18 can be pivotally coupled to the base member 12 about the additional pivot axis A2. The operating lever 20 can be pivotally coupled to the adapter 18 about the pivot axis A1.

Figure 4:
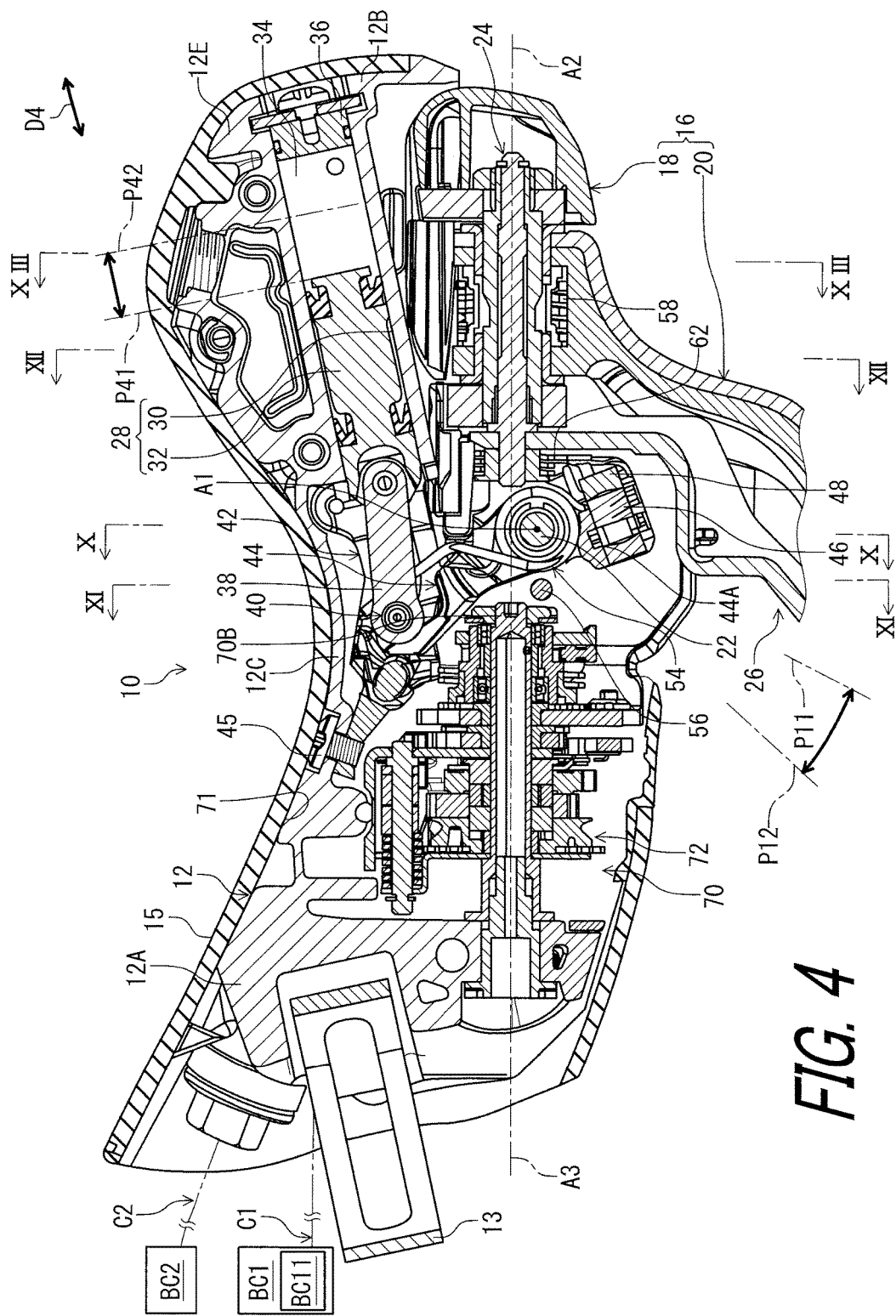
FIG. 4 is a partial cross-sectional view of the bicycle operating device taken along line IV-IV of FIG. 3.

As seen in FIG. 4, the bicycle operating device 10 comprises a pivot shaft 22. The operating member 16 includes an operating shaft 24. The pivot shaft 22 pivotally couples the adapter 18 to the base member 12 about the pivot axis A1. The pivot shaft 22 defines the pivot axis A1. The operating shaft 24 pivotally couples the operating lever 20 to the adapter 18 about the additional pivot axis A2. The operating shaft 24 defines the additional pivot axis A2.

Figure 5:
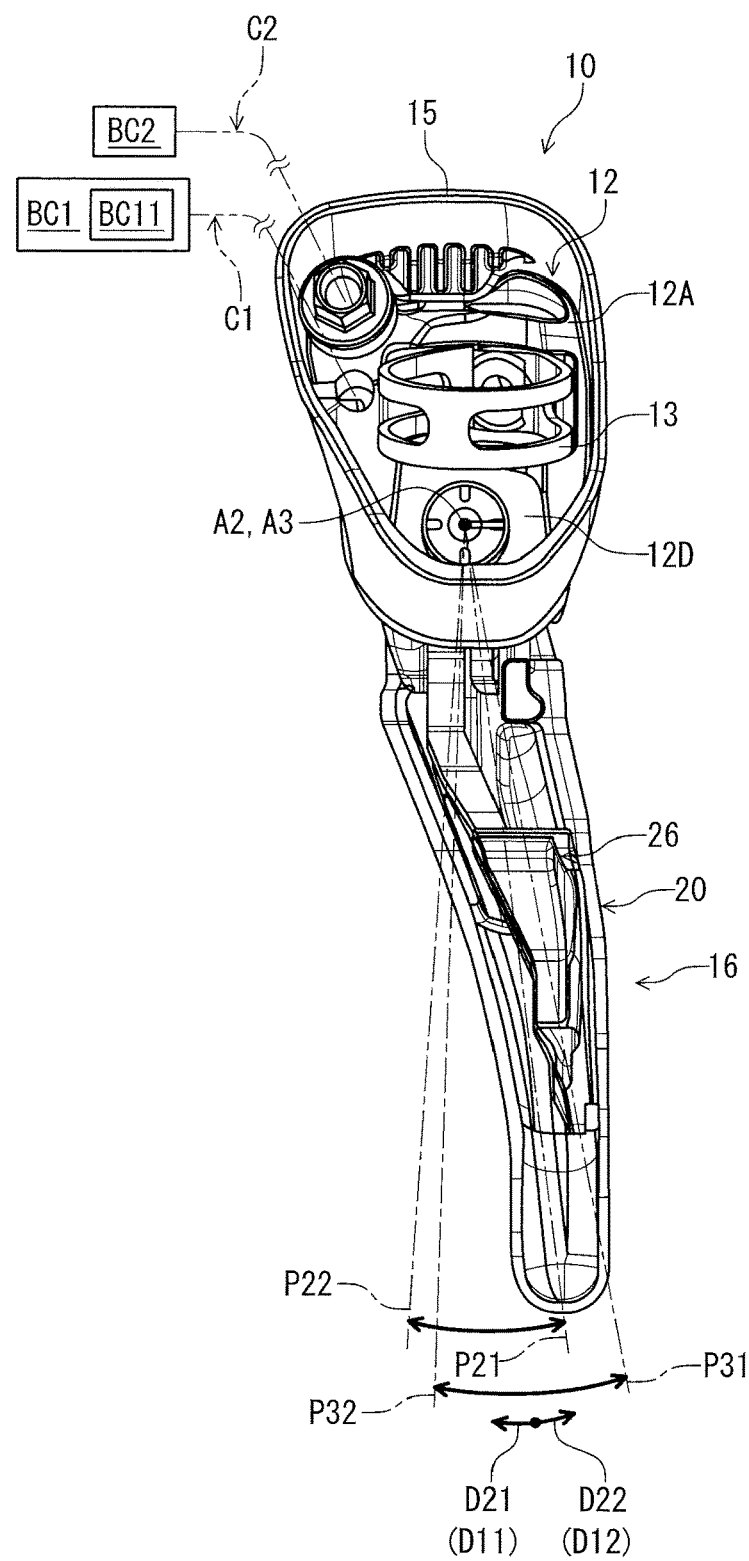
FIG. 5 is a rear view of the bicycle operating device illustrated in FIG. 1.

As seen in FIG. 5, the bicycle operating device 10 further comprises an additional operating member 26. The additional operating member 26 is pivotally provided on one of the operating member 16 and the base member 12 about the additional pivot axis A2. In this embodiment, the additional operating member 26 is pivotally provided on the operating member 16. Specifically, the additional operating member 26 is pivotally coupled to the adapter 18 about the additional pivot axis A2. The operating shaft 24 pivotally couples the additional operating member 26 to the adapter 18 about the additional pivot axis A2.

The additional operating member 26 is pivotable relative to the base member 12 between a second rest position P31 and a second operated position P32. The additional operating member 26 is pivoted relative to the base member 12 from the second rest position P31 to the second operated position P32 in a second operating direction D21. The additional operating member 26 is pivoted relative to the base member 12 from the second operated position P32 toward the second rest position P31 in a second release direction D22 opposite to the second operating direction D21.

The second operating direction D21 and the second release direction D22 are defined along the circumferential direction defined about the additional pivot axis A2. The second operating direction D21 coincides with the first operating direction D11. The second release direction D22 coincides with the first release direction D12. However, the second operating direction D21 can be different from the first operating direction D11. The second release direction D22 can be different from the first release direction D12. In this embodiment, the additional operating member 26 is provided as an additional shift lever pivotable about the additional pivot axis A2. However, the additional operating member 26 is not limited to the additional shift lever. The additional operating member 26 can be omitted from the bicycle operating device 10.

As seen in FIG. 4, the bicycle operating device 10 comprises a hydraulic unit 28 provided on the base member 12. The hydraulic unit 28 includes a cylinder bore 30 and a piston 32 movably provided in the cylinder bore 30. In this embodiment, the base member 12 includes the cylinder bore 30. The cylinder bore 30 and the piston 32 define a hydraulic chamber 34. The hydraulic unit 28 includes a closing member 36 attached to the base member 12 to close an end of the cylinder bore 30. The cylinder bore 30, the piston 32, and the closing member 36 define the hydraulic chamber 34. The hydraulic chamber 34 is connected to the additional bicycle component BC2 with a fluid passageway (not shown) and the hydraulic hose C2 to supply a hydraulic pressure to the additional bicycle component BC2.

The piston 32 is movable relative to the cylinder bore 30 in response to a pivotal movement of the operating member 16. Specifically, the piston 32 is movable relative to the cylinder bore 30 between an initial position P41 and an actuated position P42. The initial position P41 corresponds to the rest position P11 of the operating member 16. The actuated position P42 corresponds to the operated position P12 of the operating member 16. Specifically, the piston 32 is at the initial position P41 in the rest state where the operating member 16 is at the rest position P11 (FIG. 1). The piston 32 is at the actuated position P42 in an operated state where the operating member 16 is at the operated position P12 (FIG. 1). The piston 32 is configured to be pushed from the initial position P41 to the actuated position P42 in response to the pivotal movement of the operating member 16 from the rest position P11 toward the operated position P12 to supply the hydraulic pressure to the additional bicycle component BC2.

Figure 6:
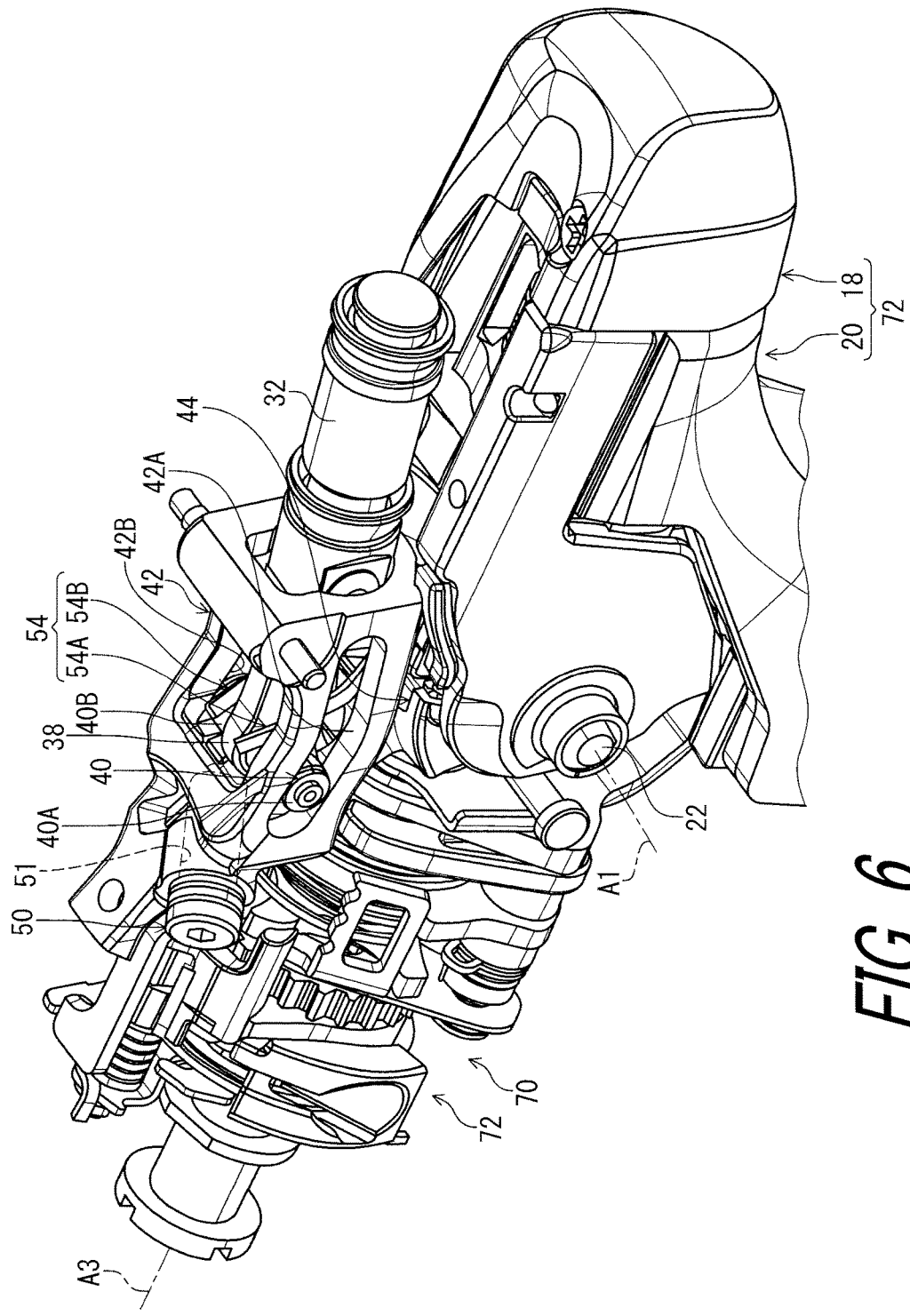
FIG. 6 is a perspective view of an internal structure of the bicycle operating device illustrated in FIG. 1.
Figure 7:
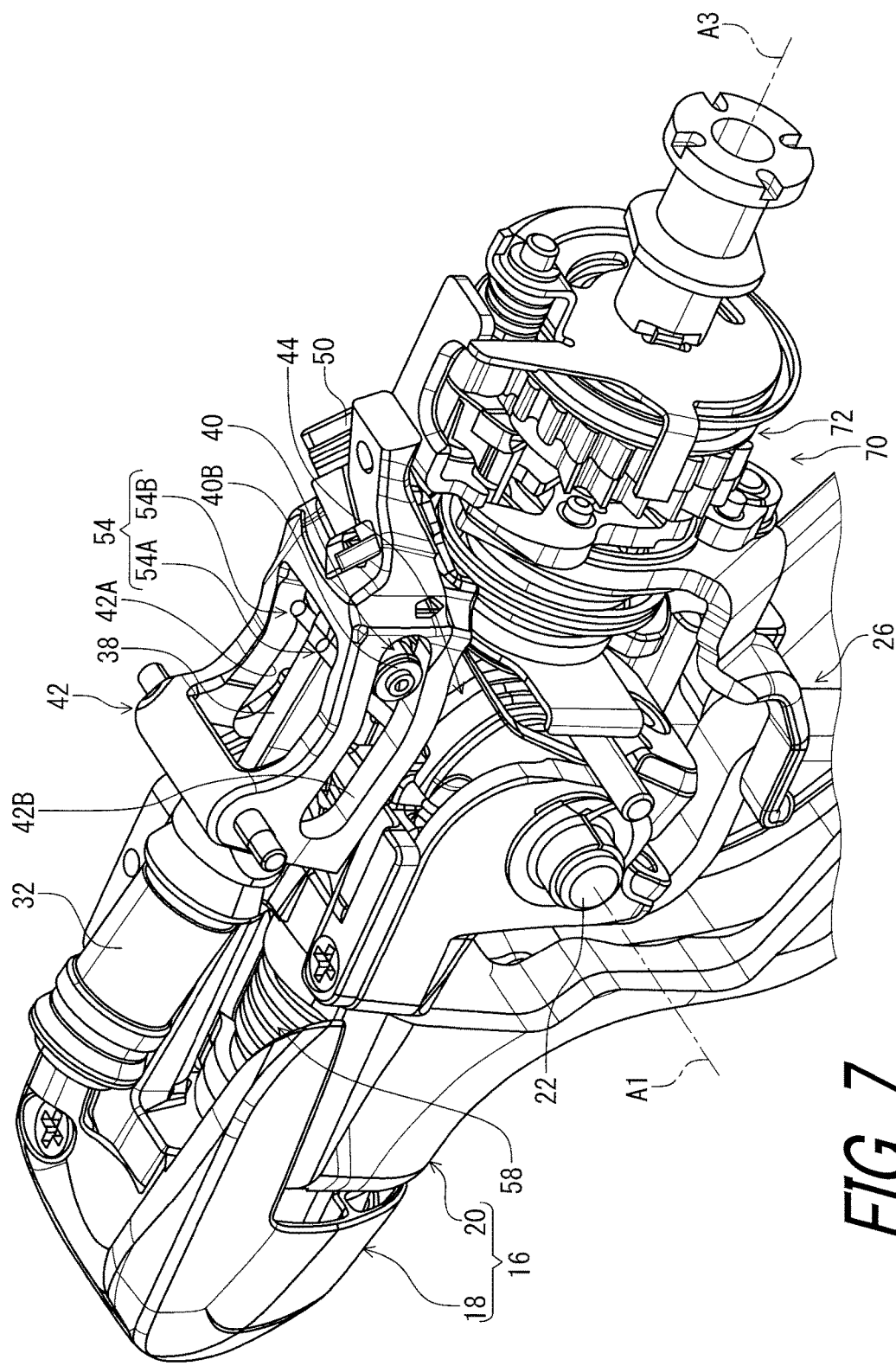
FIG. 7 is another perspective view of the internal structure of the bicycle operating device illustrated in FIG. 1.

As seen in FIGS. 4, 6, and 7, the bicycle operating device 10 comprises a piston rod 38, a guide pin 40, a guide member 42, and a transmitting member 44. The piston rod 38 operatively couples the piston 32 to the guide pin 40. As seen in FIG. 4, the guide member 42 is detachably attached to the base member 12 with a screw 45. As seen in FIGS. 6 and 7, the guide member 42 includes a pair of guide grooves 42A and 42B. Ends 40A and 40B of the guide pin 40 are movably provided in the guide grooves 42A and 42B, respectively.

Figure 8:
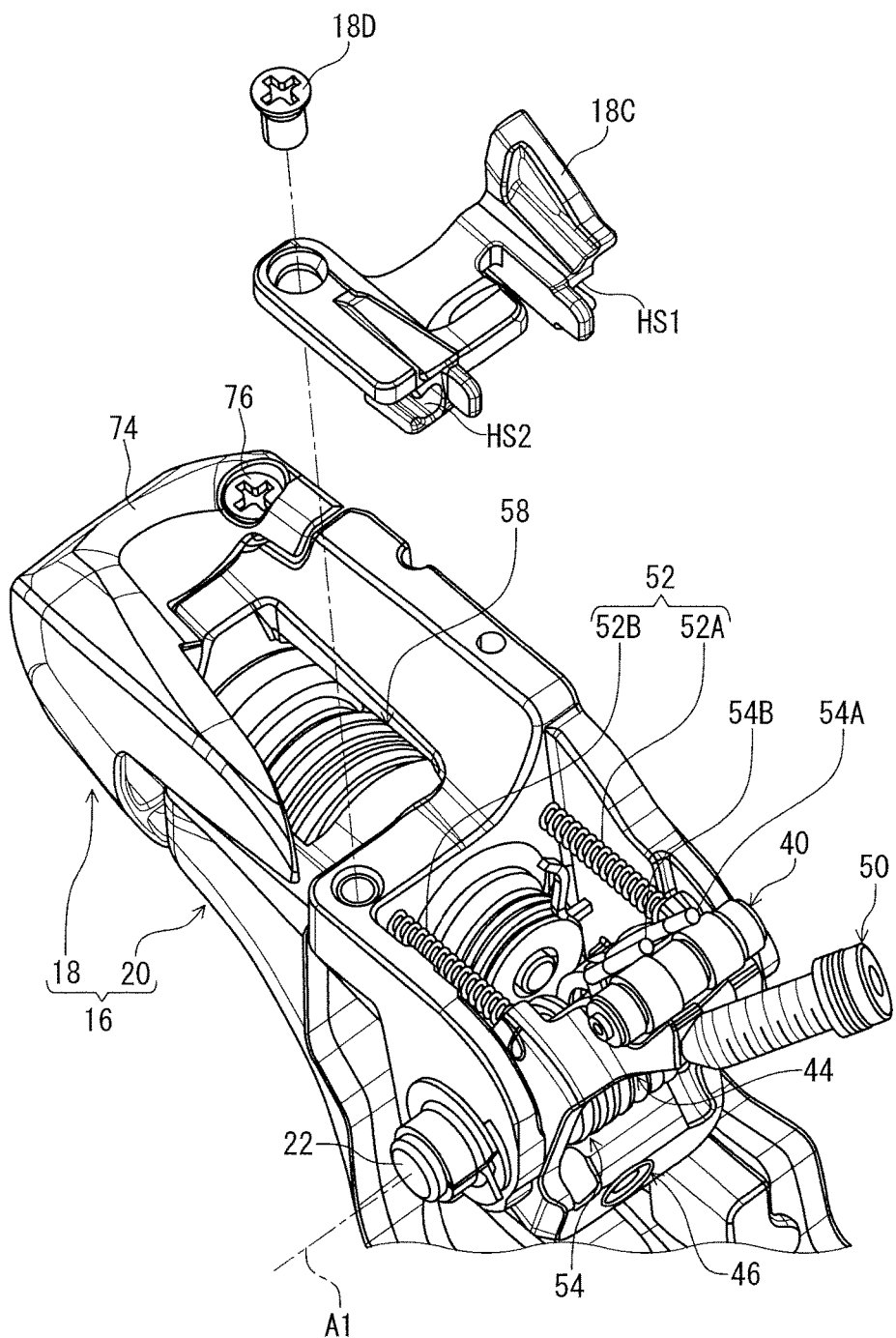
FIG. 8 is a partial cross-sectional view of the bicycle operating device illustrated in FIG. 1.

As seen in FIG. 8, the transmitting member 44 is pivotally coupled to the base member 12 with the pivot shaft 22. The transmitting member 44 is in contact with the guide pin 40. The transmitting member 44 is pivotable relative to the base member 12 about the pivot axis A1 to transmit the pivotal movement of the operating member 16 to the guide pin 40.

As seen in FIG. 4, the bicycle operating device 10 comprises an adjustment member 46 and a receiving member 48. The adjustment member 46 is attached to one of the transmitting member 44 and the operating member 16 to change the rest position P11 of the operating member 16 relative to the base member 12. The receiving member 48 is provided to the other of the transmitting member 44 and the operating member 16 to be movable with the adjustment member 46 in response to the pivotal movement of the operating member 16 relative to the base member 12. In this embodiment, the adjustment member 46 is attached to the transmitting member 44, and the receiving member 48 is provided to the operating member 16. However, the adjustment member 46 can be attached to the operating member 16, and the receiving member 48 can be provided to the transmitting member 44.

Figure 9:
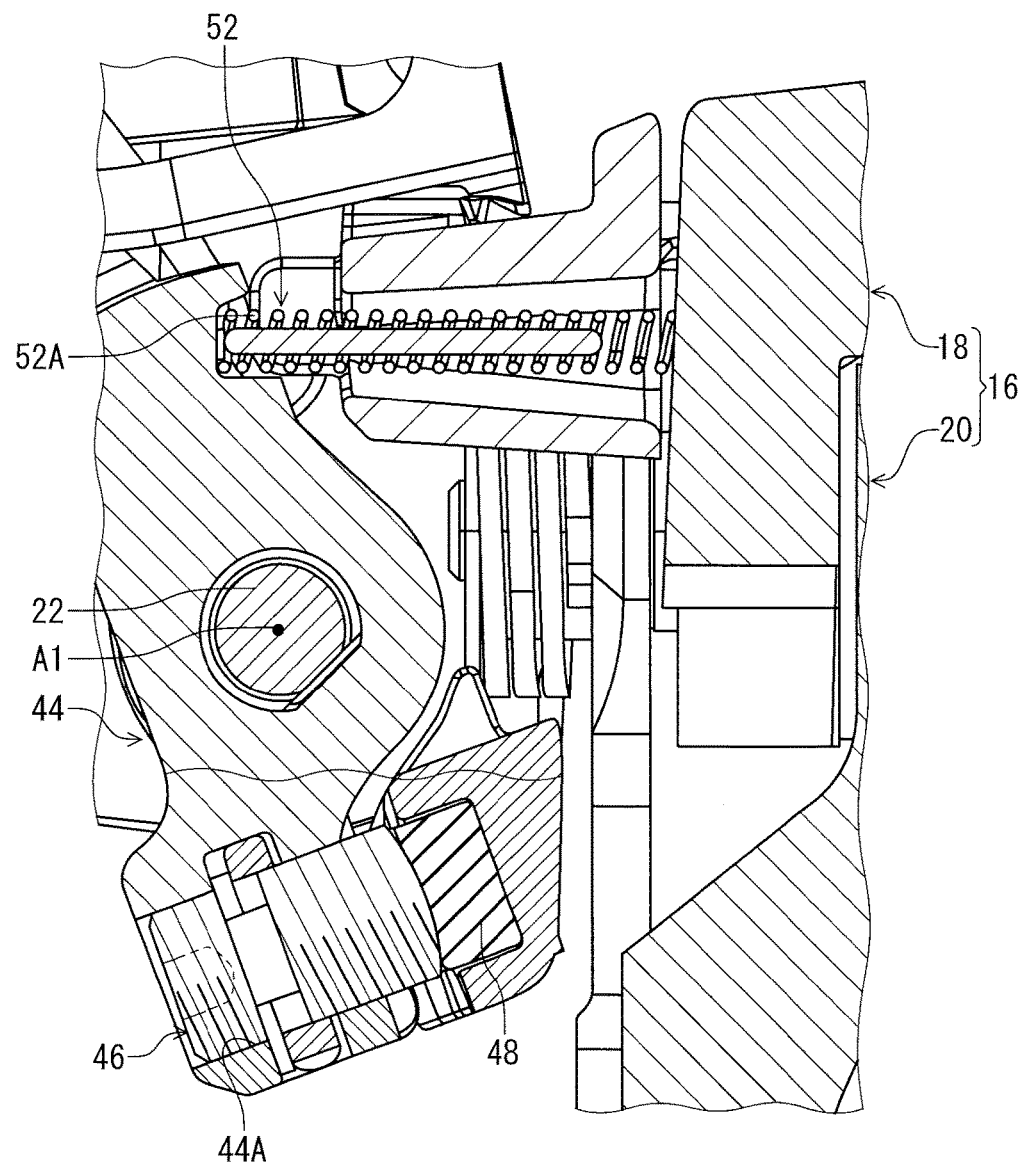
FIG. 9 is an exploded perspective view of an internal structure of the bicycle operating device illustrated in FIG. 1.

As seen in FIG. 9, for example, the adjustment member 46 includes an adjustment screw. The transmitting member 44 includes a first adjustment threaded hole 44A. The adjustment member 46 is threadedly engaged with the first adjustment threaded hole 44A. An end of the adjustment member 46 is in contact with the receiving member 48.

As seen in FIG. 6, the bicycle operating device 10 comprises an additional adjustment member 50 to change the initial position P41 (FIG. 4) of the piston 32 relative to the base member 12. In this embodiment, the additional adjustment member 50 includes an adjustment screw mounted to the guide member 42. The additional adjustment member 50 is threadedly engaged with a second adjustment threaded hole 51 (FIG. 6) of the guide member 42. As seen in FIG. 8, an end of the additional adjustment member 50 is in contact with the transmitting member 44.

As seen in FIGS. 8 and 9, the bicycle operating device 10 comprises a first biasing member 52 provided between the operating member 16 and the transmitting member 44 to bias the adjustment member 46 toward the receiving member 48. In this embodiment, as seen in FIG. 8, the first biasing member 52 includes first biasing parts 52A and 52B. For example, each of the first biasing parts 52A and 52B include a coiled spring. As seen in FIG. 9, the first biasing member 52 is provided on an opposite side of the adjustment member 46 and the receiving member 48 relative to the pivot axis A1 as viewed along the pivot axis A1. The first biasing member 52 is provided on an opposite side of the adjustment member 46 and the receiving member 48 relative to the pivot axis A1 as viewed along the pivot axis A1.

As seen in FIG. 8, the operating member 16 includes a holding part 18C. The holding part 18C is attached to the adapter 18 to hold the first biasing member 52. The holding part 18C is secured to the adapter 18 with a screw 18D. The holding part 18C includes holding openings HS1 and HS2.

The first biasing parts 52A is provided in the holding opening HS1. The first biasing parts 52B is provided in the holding opening HS2.

Figure 10:
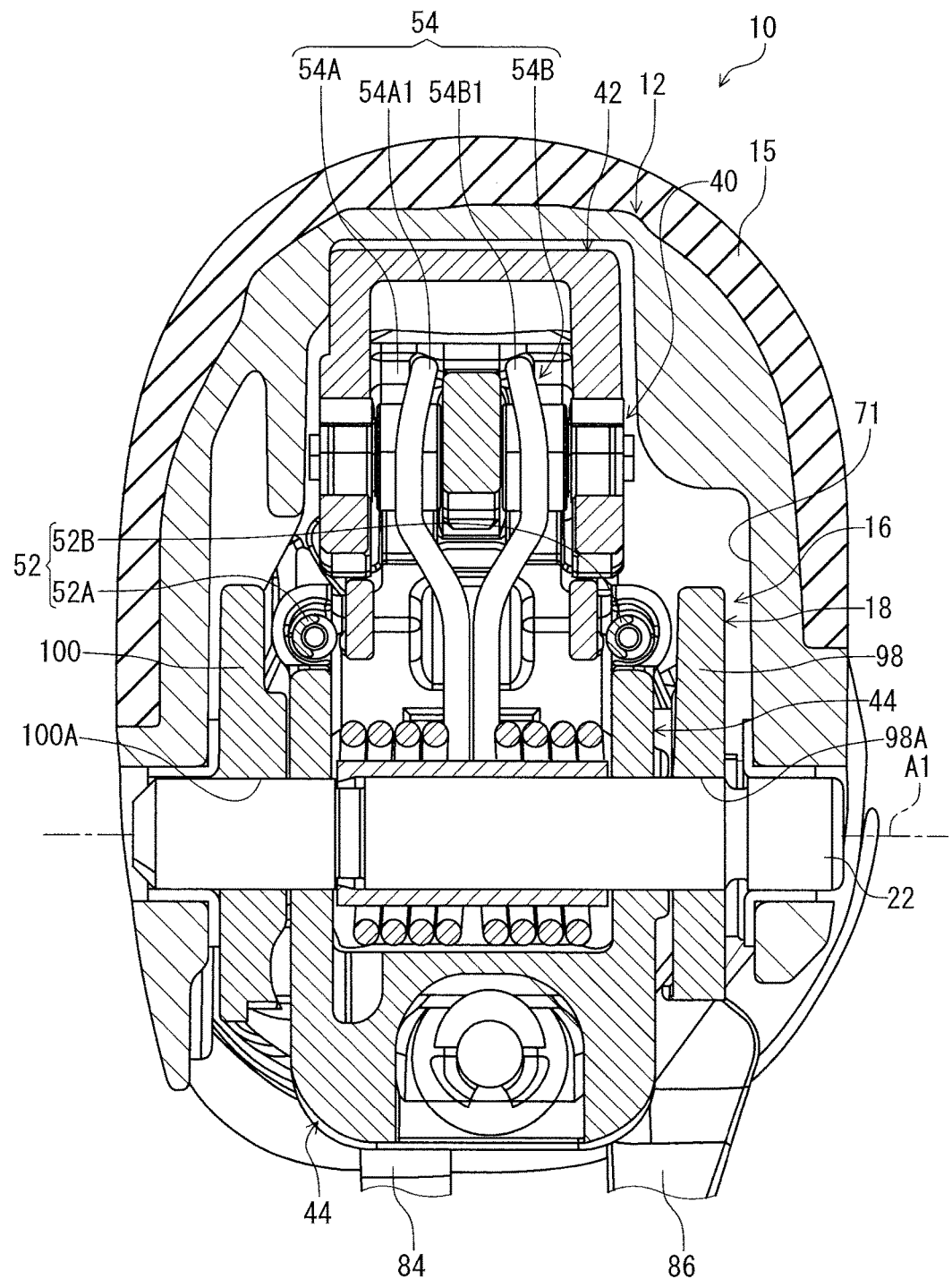
FIG. 10 is a cross-sectional view of the bicycle operating device taken along line X-X of FIG. 4.

As seen in FIG. 10, the bicycle operating device 10 comprises a second biasing member 54 to bias the operating member 16 toward the rest position P11 (FIG. 1) relative to the base member 12. The second biasing member 54 is mounted on the pivot shaft 22. In this embodiment, the second biasing member 54 includes a torsion spring. The second biasing member 54 includes a second biasing parts 54A and 54B. For example, each of the second biasing parts 54A and 54B include a coiled spring. The second biasing parts 54A and 54B are mounted on the pivot shaft 22. A first end 54A1 of the second biasing part 54A is in contact with the guide pin 40. A first end 54B1 of the second biasing part 54B is in contact with the guide pin 40.

Figure 11:
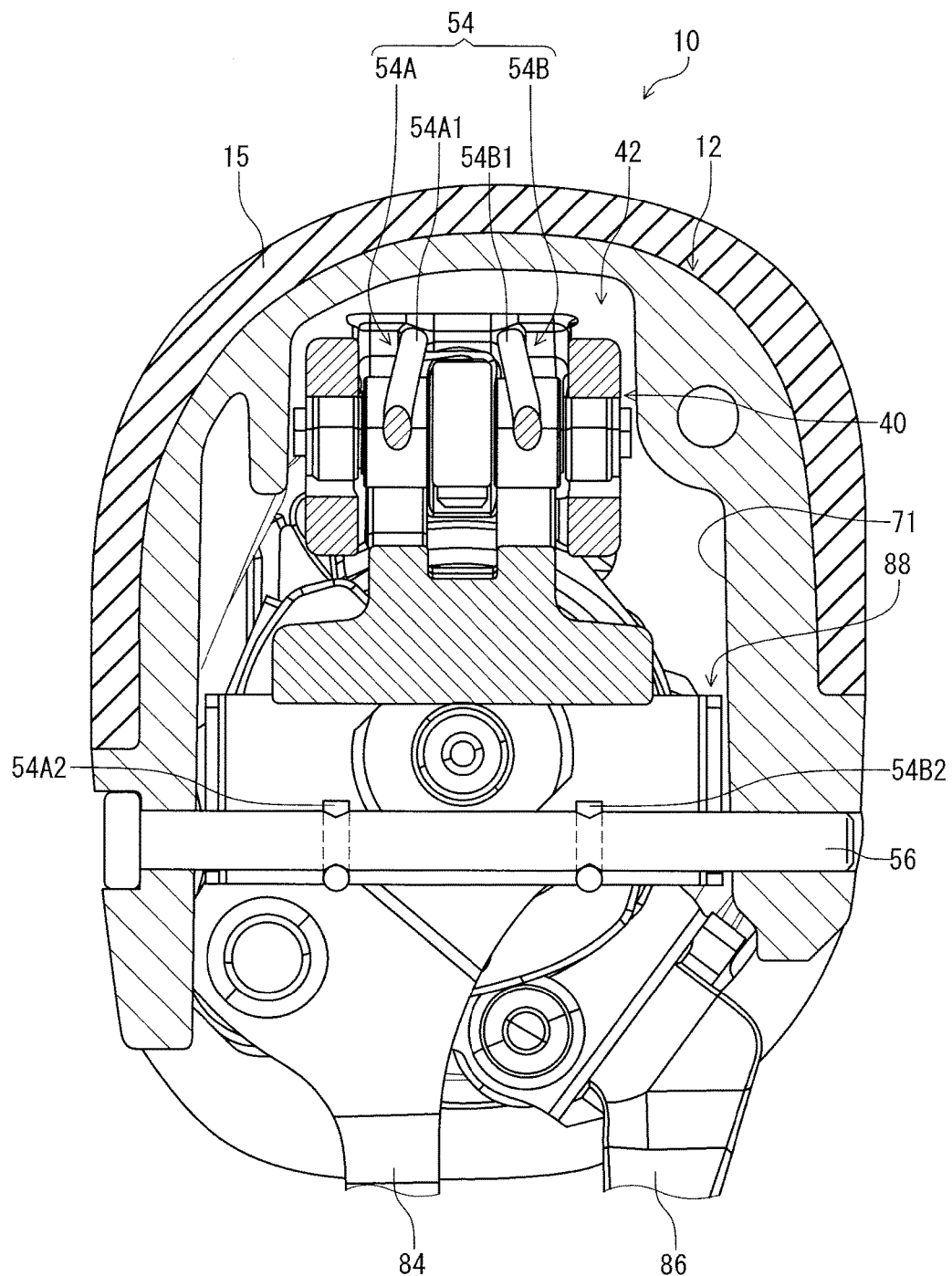
FIG. 11 is a cross-sectional view of the bicycle operating device taken along line XI-XI of FIG. 4.

As seen in FIG. 11, the bicycle operating device 10 comprises a support rod 56 secured to the base member 12. A second end 54A2 of the second biasing part 54A is received by the support rod 56. A second end 54B2 of the second biasing part 54B is received by the support rod 56.

As seen in FIG. 8, the transmitting member 44 is pressed by the second biasing member 54 against the additional adjustment member 50. The additional adjustment member 50 and the second biasing member 54 position the operating member 16 at the rest position P11 (FIG. 1). Furthermore, the second biasing member 54 biases the piston 32 toward the initial position P41 (FIG. 4). The additional adjustment member 50 and the second biasing member 54 position the piston 32 at the initial position P41 (FIG. 4).

As seen in FIG. 4, rotation of the adjustment member 46 relative to the transmitting member 44 changes a position of the operating member 16 relative to the transmitting member 44. This changes the rest position P11 of the operating member 16 without changing the initial position P41 of the piston 32. Rotation of the additional adjustment member 50 changes a position of the transmitting member 44 relative to the base member 12. This changes the initial position P41 of the piston 32 and further changes the rest position P11 of the operating member 16.

The bicycle operating device 10 comprises a third biasing member 58 to bias the operating lever 20 toward the first rest position P21 (FIG. 3) relative to the adapter 18. The third biasing member 58 is mounted on the operating shaft 24. For example, the third biasing member 58 includes a torsion spring.

Figure 12:
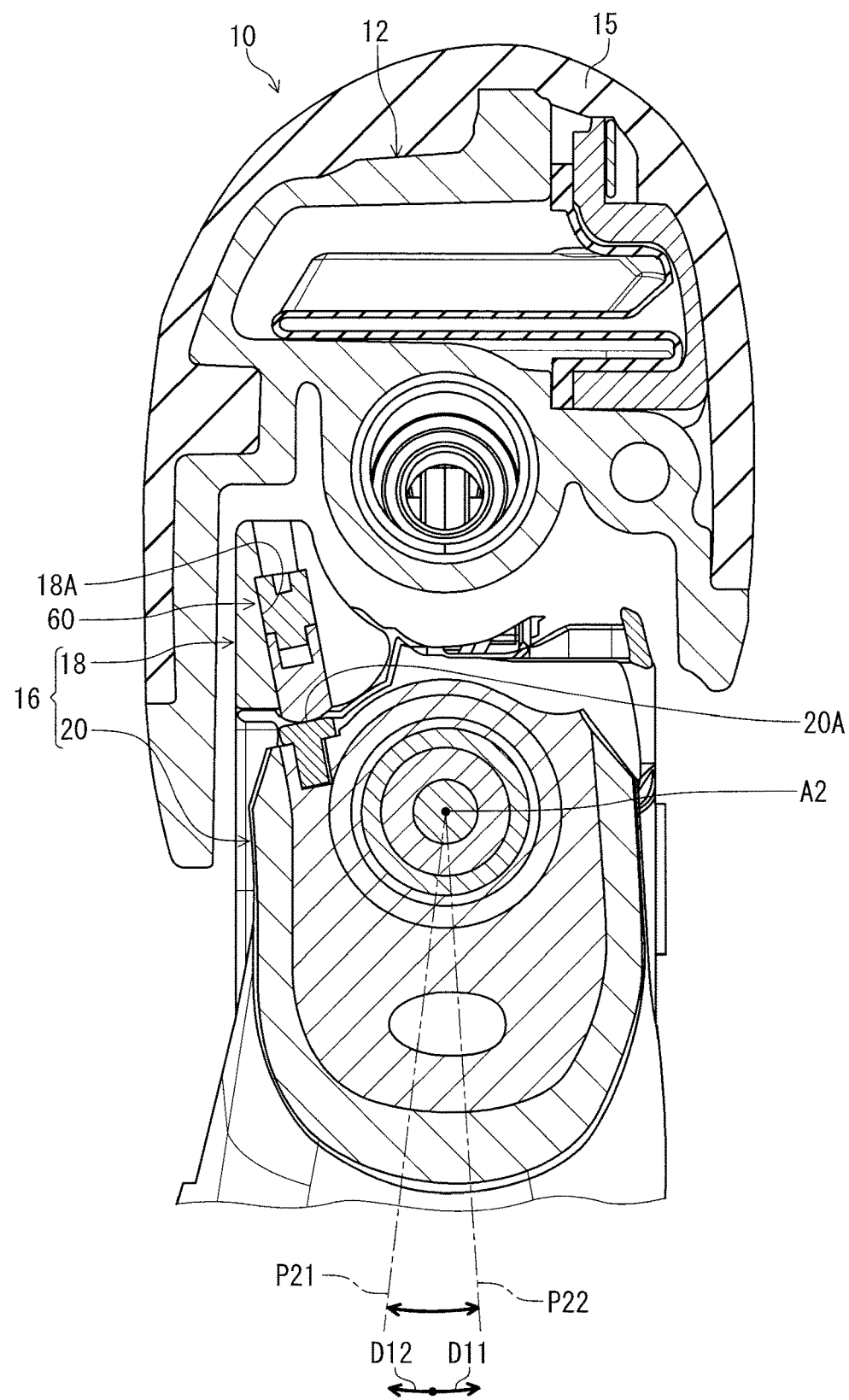
FIG. 12 is a cross-sectional view of the bicycle operating device taken along line XII-XII of FIG. 4.

As seen in FIG. 12, the adapter 18 positions the operating lever 20 at the first rest position P21. In this embodiment, the bicycle operating device 10 comprises an adjustment part 60 attached to the adapter 18 to change the first rest position P21 of the operating member 16 relative to the base member 12. The adjustment part 60 is in contact with a stopper surface 20A of the operating lever 20 to position the operating lever 20 at the first rest position P21. The adapter 18 includes a threaded-hole 18A threadedly engaged with the adjustment part 60. Rotation of the adjustment part 60 changes the first rest position P21 of the operating lever 20 relative to the adapter 18.

As seen in FIG. 4, the bicycle operating device 10 comprises a fourth biasing member 62 to bias the additional operating member 26 toward the second rest position P31 (FIG. 5) relative to the base member 12. In this embodiment, the fourth biasing member 62 biases the additional operating member 26 toward the second rest position P31 (FIG. 5) relative to the operating member 16 (the adapter 18). The fourth biasing member 62 is mounted on the operating shaft 24. For example, the fourth biasing member 62 includes a torsion spring. As seen in FIG. 5, the operating member 16 (the operating lever 20) is in contact with the additional operating member 26 to position the additional operating member 26 at the second rest position P31.

Figure 13:
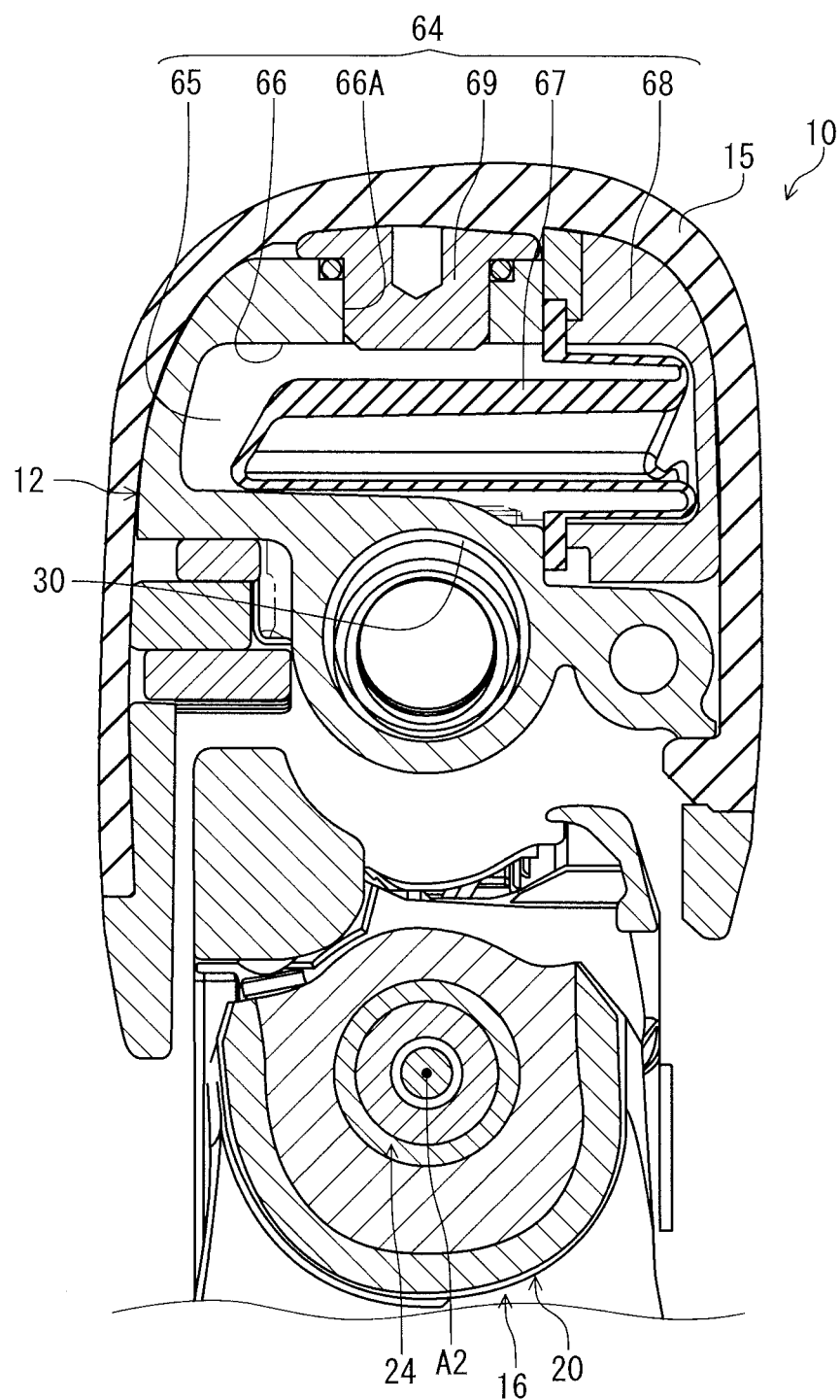
FIG. 13 is a cross-sectional view of the bicycle operating device taken along line XIII-XIII of FIG. 4.

As seen in FIG. 13, the hydraulic unit 28 comprises a hydraulic reservoir 64. The hydraulic reservoir 64 includes a reservoir chamber 65 connected to the hydraulic chamber 34. As seen in FIG. 4, the hydraulic reservoir 64 is provided at the first end portion 12A. In this embodiment, the hydraulic reservoir 64 is provided at the pommel portion 12E.

As seen in FIG. 13, the hydraulic reservoir 64 includes a reservoir recess 66, a diaphragm 67, and a lid 68. In this embodiment, the base member 12 includes the reservoir recess 66. The diaphragm 67 is at least partly disposed in the reservoir recess 66. The reservoir recess 66 and the diaphragm 67 define the reservoir chamber 65 in the reservoir recess 66. In this embodiment, the hydraulic reservoir 64 includes a bleed member 69. The base member 12 includes a bleeding hole 66A. The bleed member 69 is detachably attached to the base member 12 to close the bleeding hole 66A. The reservoir recess 66, the diaphragm 67, and the bleed member 69 define the reservoir chamber 65 in the reservoir recess 66. The reservoir chamber 65 is connected to the hydraulic chamber 34 via at least one connection holes (not shown). The hydraulic reservoir 64 can be omitted from the bicycle operating device 10.

As seen in FIG. 4, the bicycle operating device 10 comprises an operating structure 70. The operating structure 70 is provided between the first end portion 12A and the second end portion 12B. The operating structure 70 is provided in an accommodation space 71 of the base member 12. The operating structure 70 includes a rotatable member 72 rotatable relative to the base member 12 (FIG. 4) about a rotational axis A3 to control the bicycle component BC1. The rotatable member 72 is rotatable relative to the base member 12 (FIG. 4) about the rotational axis A3 to operate the shift device BC11. An end of the control cable C1 is coupled to the rotatable member 72. The operating structure 70 is configured to wind and position the control cable C1 in response to a pivotal movement of the operating member 16 from the first rest position P21 (FIG. 5) to the first operated position P22 (FIG. 5). The operating structure 70 is configured to unwind (release) and position the control cable C1 in response to a pivotal movement of the additional operating member 26 from the second rest position P31 (FIG. 5) to the second operated position P32 (FIG. 5). The operating structure 70 includes a structure which has been known in the bicycle field. Thus, it will not be described in detail here for the sake of brevity. The structure of the operating structure 70 is not limited to this embodiment.

Figure 14:
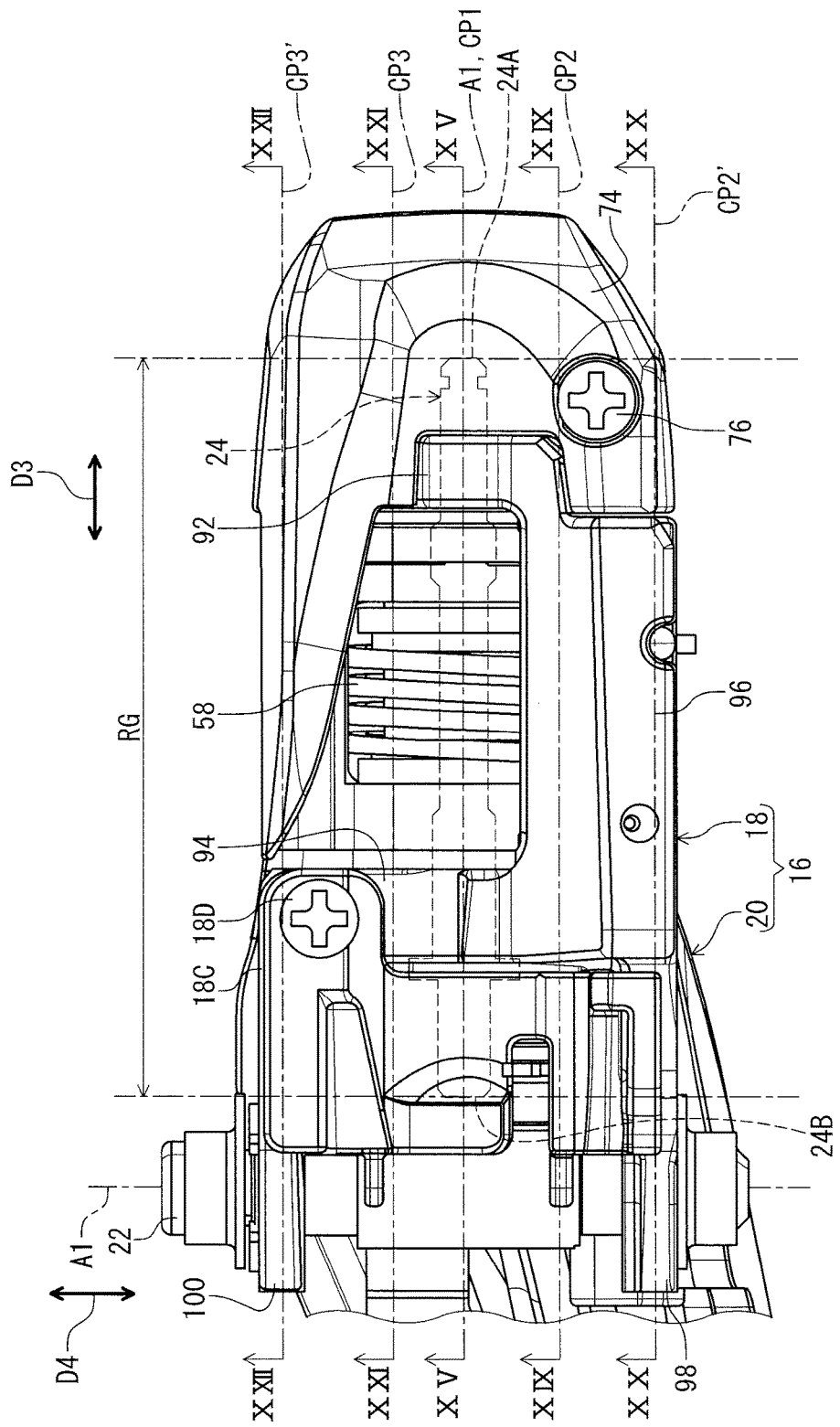
FIG. 14 is a plan view of an operating member of the bicycle operating device illustrated in FIG. 1, with an adapter cover.

As seen in FIG. 14, the operating member 16 includes an adapter cover 74 secured to the adapter 18 with a screw 76. The adapter cover 74 is a separate member from the adapter 18. However, the adapter cover 74 can be integrally provided with the adapter 18 as a one-piece unitary member.

Figure 15:
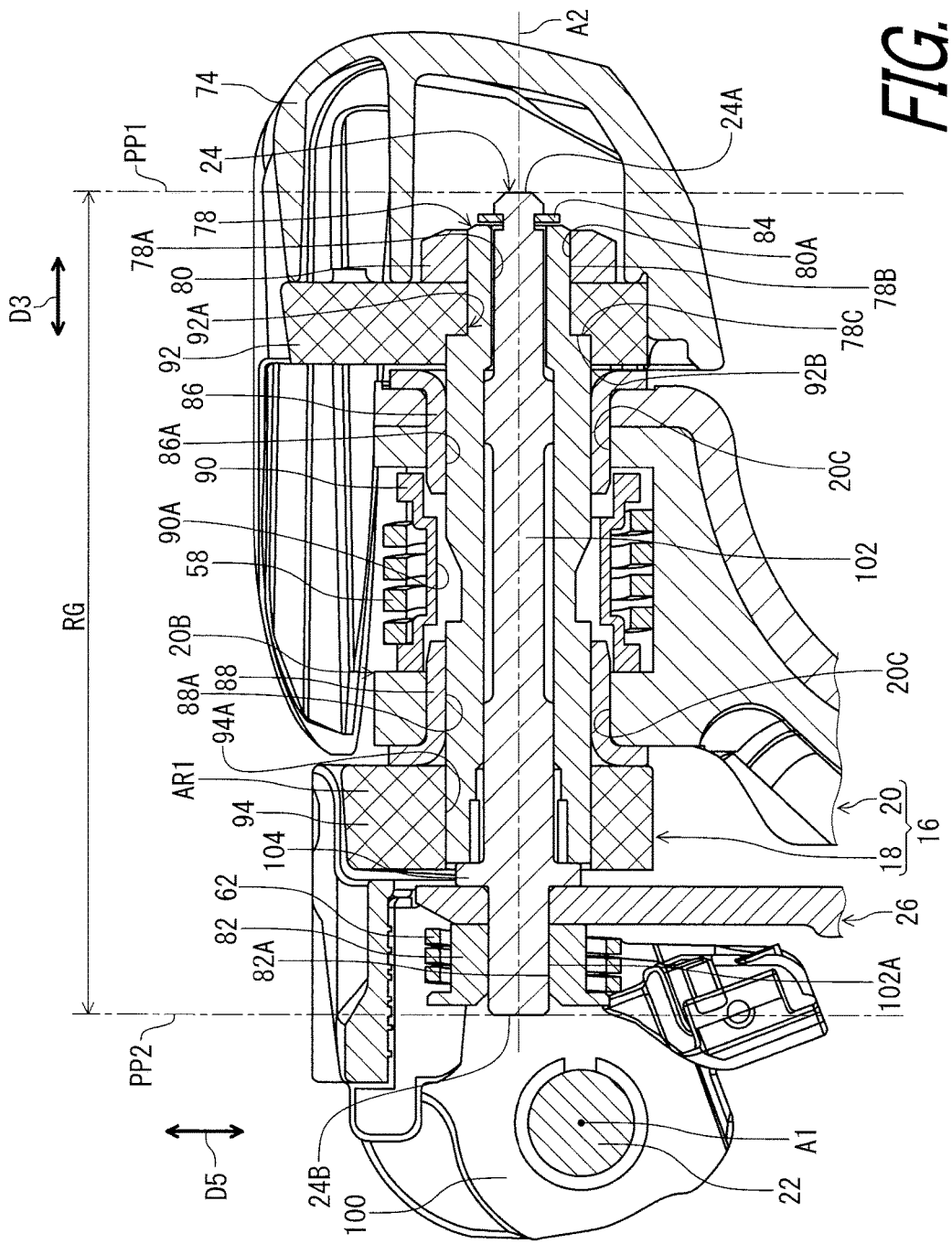
FIG. 15 is a cross-sectional view of the bicycle operating device taken along line XV-XV of FIG. 14.

As seen in FIG. 15, the operating shaft 24 includes a first shaft end 24A and a second shaft end 24B. The operating shaft 24 extends between the first shaft end 24A and the second shaft end 24B in a first direction D3 parallel to the additional pivot axis A2. The first shaft end 24A is covered with the adapter cover 74. The operating member 16 includes a shaft support 78, a first fastener 80, a second fastener 82, a snap ring 84, a first bush 86, a second bush 88, and a spring support 90. The shaft support 78 has a tubular shape and is attached to the adapter 18. The operating shaft 24 extends through a hole 78A of the shaft support 78. The operating shaft 24 is rotatably provided in the hole 78A of the shaft support 78.

Figure 16:
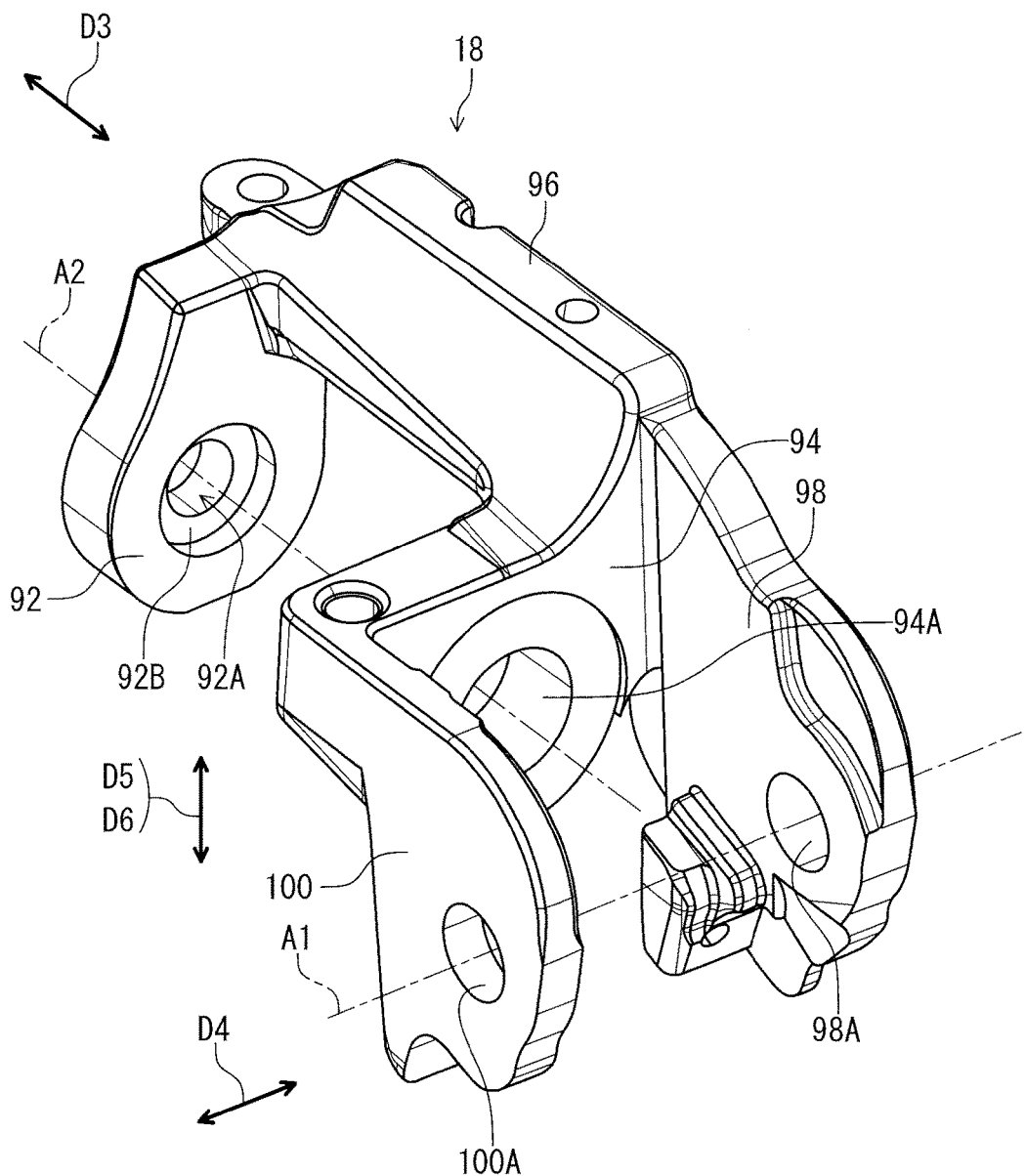
FIG. 16 is a perspective view of an adapter of the operating member of the bicycle operating device illustrated in FIG. 1.
Figure 17:
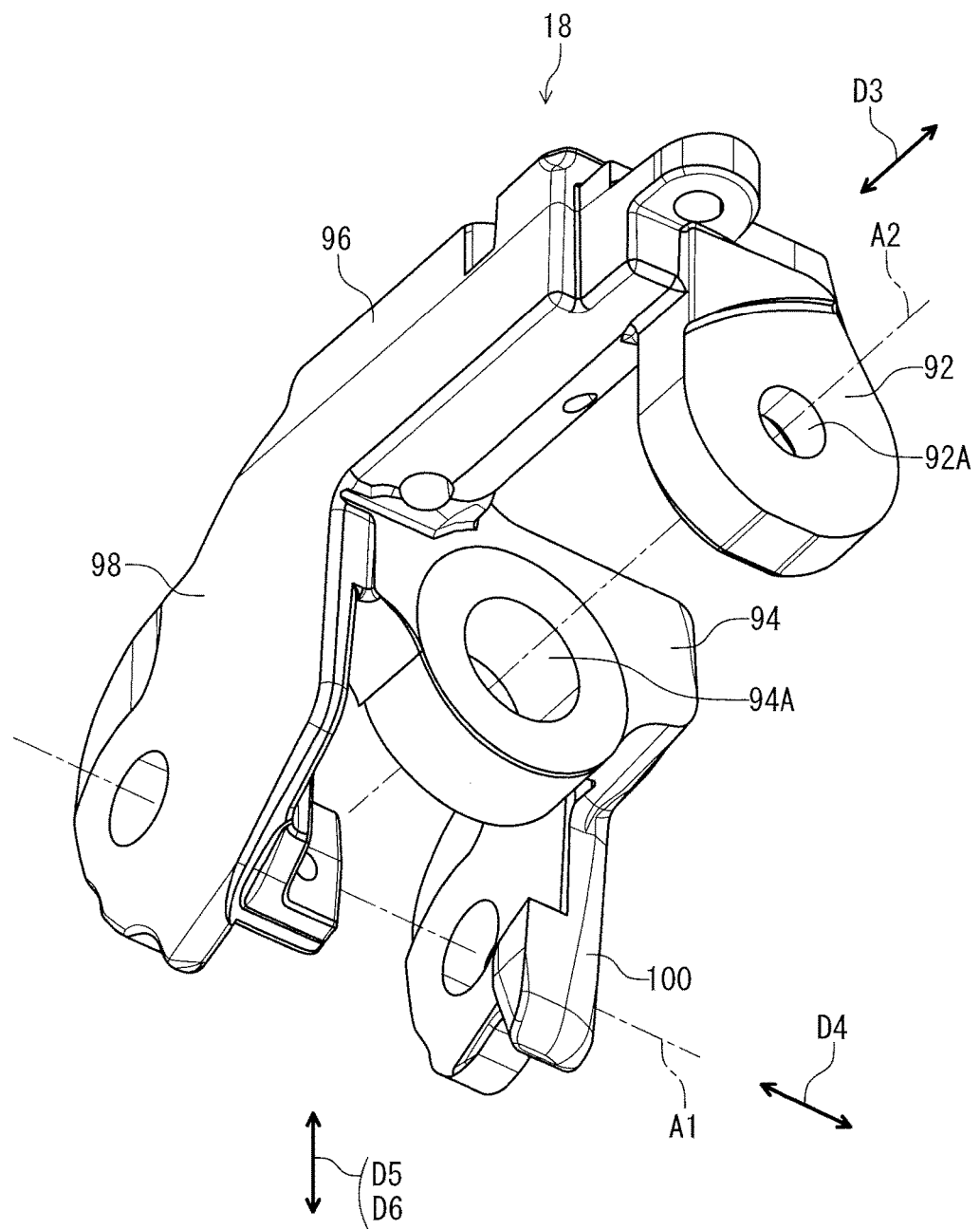
FIG. 17 is another perspective view of the adapter of the operating member of the bicycle operating device illustrated in FIG. 1.

As seen in FIGS. 16 and 17, the adapter 18 includes a first coupling part 92, a second coupling part 94, and an adapter body 96. The second coupling part 94 is spaced apart from the first coupling part 92. The adapter body 96 couples the first coupling part 92 to the second coupling part 94. The adapter body 96 extends in the first direction D3. The first coupling part 92 extends from the adapter body 96 in a second direction D4 parallel to the pivot axis A1. In this embodiment, the first direction D3 is perpendicular to the second direction D4. However, the first direction D3 can be non-perpendicular to the second direction D4. The second coupling part 94 extends from the adapter body 96 in the second direction D4. The first coupling part 92 includes a first hole 92A. The second coupling part 94 includes a second hole 94A.

As seen in FIG. 15, the operating shaft 24 extends through the first hole 92A. The operating shaft 24 extends through the second hole 94A. The operating lever 20 includes a first lever end 20B provided between the first coupling part 92 and the second coupling part 94.

As seen in FIG. 14, the adapter body 96 is offset from the additional pivot axis A2 without overlapping with the additional pivot axis A2 when viewed in a third direction D5 (FIG. 16) perpendicular to each of the first direction D3 and the second direction D4.

As seen in FIG. 15, at least one of the first coupling part 92 and the second coupling part 94 is provided between the first perpendicular plane PP1 and the second perpendicular plane PP2. In this embodiment, the first coupling part 92 and the second coupling part 94 are provided between the first perpendicular plane PP1 and the second perpendicular plane PP2.

The adapter 18 includes a third coupling part 98, and a fourth coupling part 100. The third coupling part 98 extends from the adapter body 96 along the additional pivot axis A2. The fourth coupling part 100 extends from the second coupling part 94 along the additional pivot axis A2. The third coupling part 98 is spaced apart from the fourth coupling part 100 along the pivot axis A1. In this embodiment, the adapter 18 is integrally provided as a one-piece unitary member. However, the adapter 18 can be constituted by separate parts.

As seen in FIG. 10, the third coupling part 98 includes a third hole 98A. The fourth coupling part 100 includes a fourth hole 100A coaxial with the third hole 98A. The pivot shaft 22 extends through the third hole 98A and the fourth hole 100A.

As seen in FIG. 15, the shaft support 78 includes a first externally threaded part 78B. The first fastener 80 includes a first threaded hole 80A. The first externally threaded part 78B is threadedly engaged with the first threaded hole 80A to secure the shaft support 78 to the first support of the adapter 18. The shaft support 78 includes a first support surface 78C facing along the additional pivot axis A2. The first coupling part 92 includes a second support surface 92B provided in the first hole 92A. The second support surface 92B faces in the first direction D3 toward the second coupling part 94. The first support surface 78C is in contact with the second support surface 92B in a state where the shaft support 78 is secured to the first support with the first fastener 80.

The operating shaft 24 includes a shaft body 102 and a flange 104. The shaft body 102 extends between the first shaft end 24A and the second shaft end 24B. The flange 104 extends radially outwardly from the shaft body 102 and is provided between the first shaft end 24A and the second shaft end 24B. The snap ring 84 is attached to the first shaft end 24A to prevent the operating shaft 24 from being unintentionally removed from the shaft support 78. The shaft support 78 is provided between the flange 104 and the snap ring 84.

The shaft body 102 includes a second externally threaded part 102A provided at the second shaft end 24B. The second fastener 82 includes a second threaded hole 82A. The second externally threaded part 102A is threadedly engaged with the second threaded hole 82A to secure the additional operating member 26. The additional operating member 26 is held between the flange 104 and the second fastener 82. The fourth biasing member 62 is provided about the second fastener 82.

The shaft support 78 extends holes 86A, 88A, and 90A of the first bush 86, the second bush 88, and the spring support 90. The operating lever 20 includes a first operating hole 20C and a second operating hole 20D. The first bush 86 extends through the first operating hole. The second bush 88 extends through the second operating hole. An end of the first bush 86 is provided in the hole of the spring support 90. An end of the second bush 88 is provided in the hole of the spring support 90. The third biasing member 58 is provided about the spring support 90.

Figure 18:
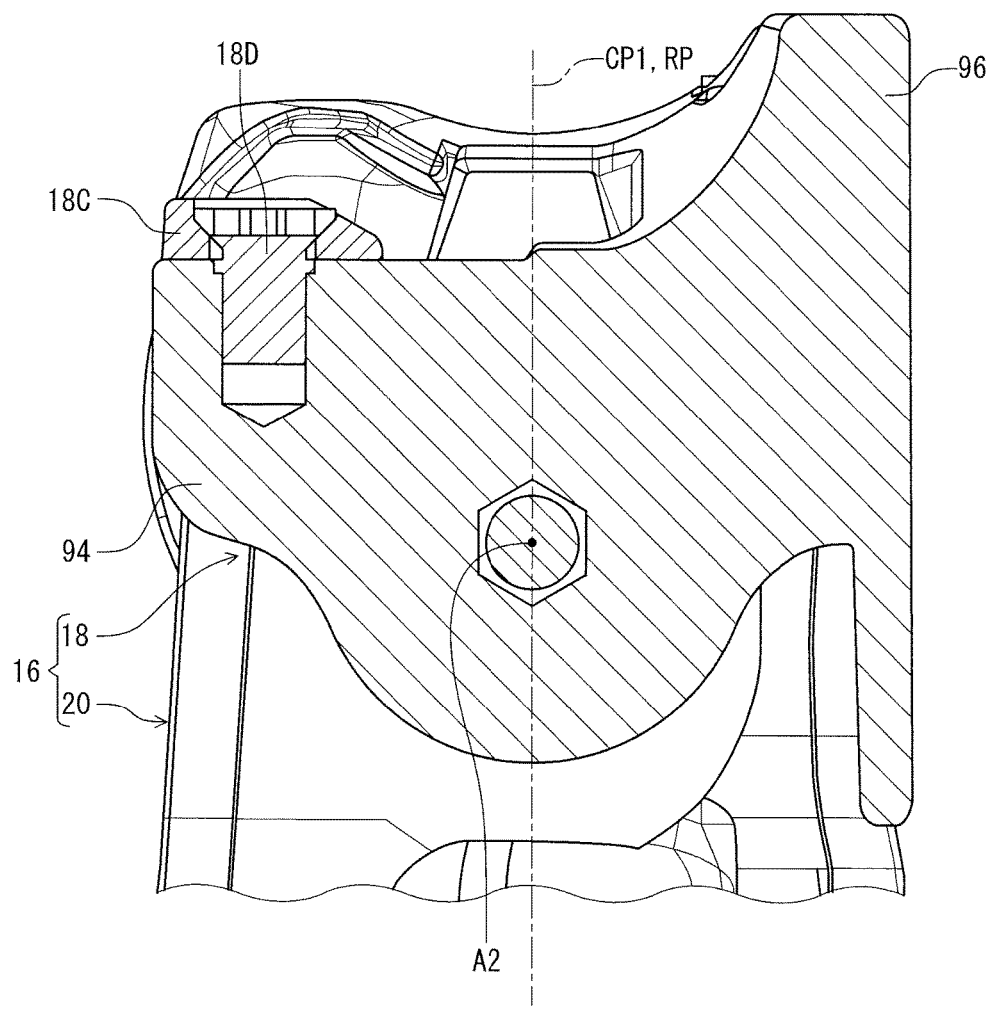
FIG. 18 is a cross-sectional view of the bicycle operating device taken along line XVIII-XVIII of FIG. 14.

As seen in FIG. 15, a first perpendicular plane PP1 is perpendicular to the additional pivot axis A2 and defined at the first shaft end 24A. A second perpendicular plane PP2 is perpendicular to the additional pivot axis A2 and defined at the second shaft end 24B. As seen in FIG. 18, a center cross sectional plane CP1 is defined on the additional pivot axis A2 when viewed in the first direction D3 (FIG. 15). The center cross sectional plane CP1 is perpendicular to the pivot axis A1. As seen in FIG. 15, the adapter 18 includes a center cross sectional area AR1 defined on a center cross sectional plane CP1. The center cross sectional area AR1 is defined between the first perpendicular plane PP1 and the second perpendicular plane PP2 in the first direction D3. The center cross sectional area AR1 is defined in a region RG defined between the first perpendicular plane PP1 and the second perpendicular plane PP2 in the first direction D3. In this embodiment, the first coupling part 92 and the second coupling part 94 include the center cross sectional area AR1. The center cross sectional area AR1 is indicated with a cross-hatching (FIG. 15).

Figure 19:
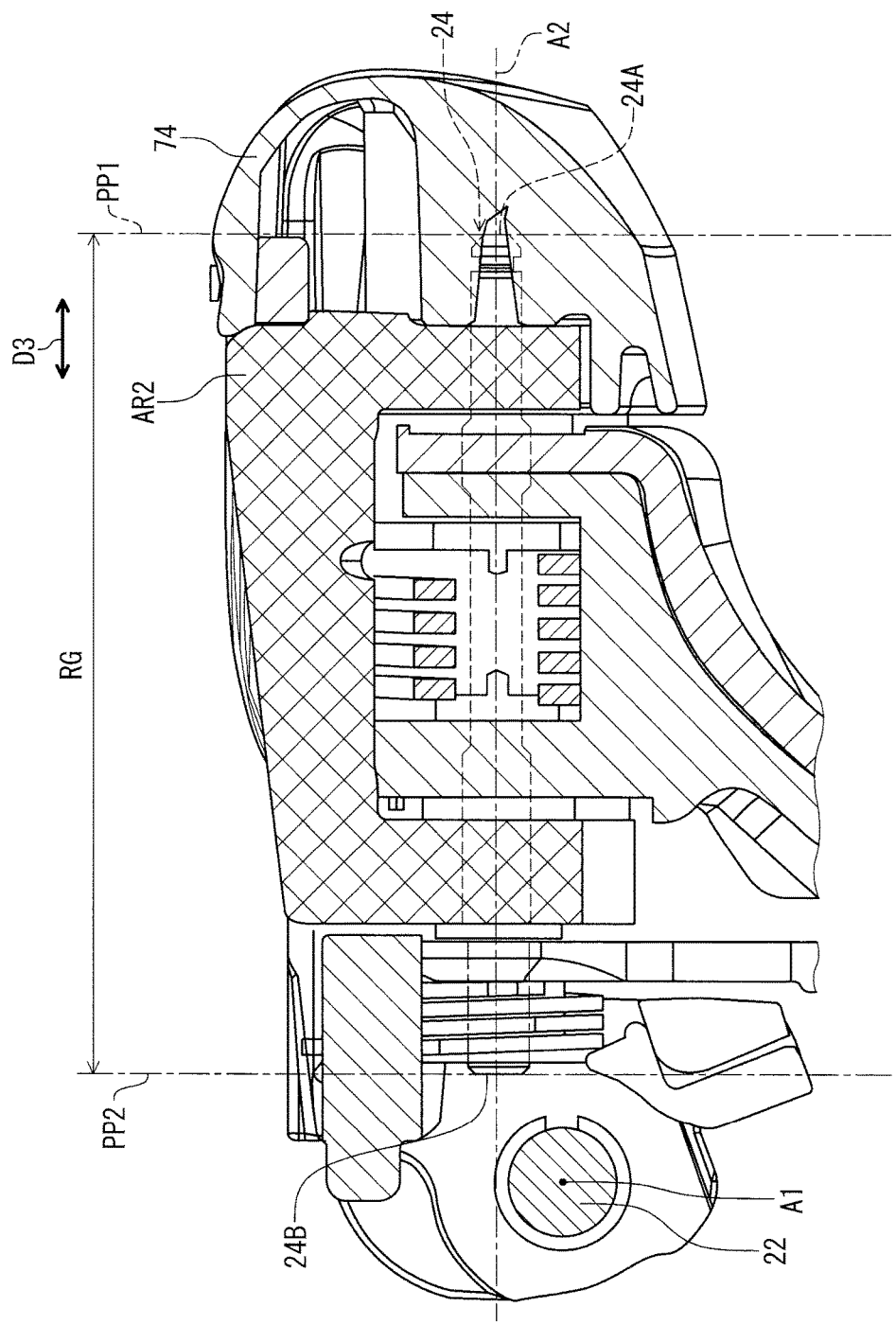
FIG. 19 is a cross-sectional view of the bicycle operating device taken along line XIX-XIX of FIG. 14.

As seen in FIG. 19, the adapter 18 includes a first cross sectional area AR2 defined on a first cross sectional plane CP2 perpendicular to the pivot axis A1. The first cross sectional area AR2 is offset from the center cross sectional area AR1 in the second direction D4 parallel to the pivot axis A1. The first cross sectional area AR2 is defined between the first perpendicular plane PP1 and the second perpendicular plane PP2 in the first direction D3. The first cross sectional area AR2 is larger than the center cross sectional area AR1. In this embodiment, the adapter body 96 includes the first cross sectional area AR2. The first cross sectional area AR2 is indicated with a cross-hatching (FIG. 19).

Figure 20:
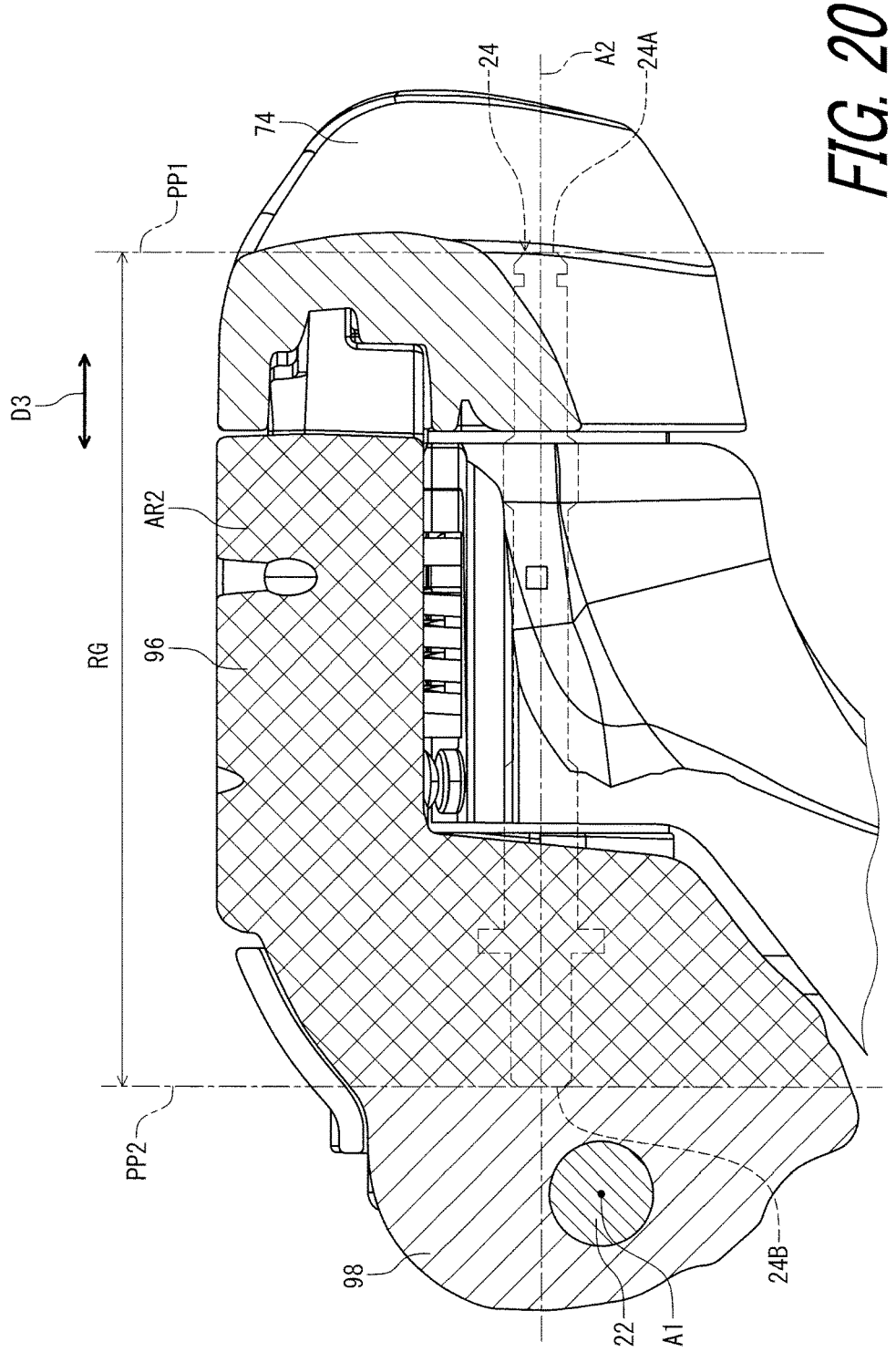
FIG. 20 is a cross-sectional view of the bicycle operating device taken along line XX-XX of FIG. 14.

As seen in FIG. 14, the first cross sectional plane CP2 can be defined at positions other than the position corresponding to FIG. 19. For example, the first cross sectional plane CP2' can be defined at a position indicated in FIG. 14. As seen in FIG. 20 corresponding to the first cross sectional plane CP2', the first cross sectional area AR2 is larger than the center cross sectional area AR1. The first cross sectional area AR2 does not include a cross sectional area of the third coupling part 98 provided outside of the region RG.

Figure 21:
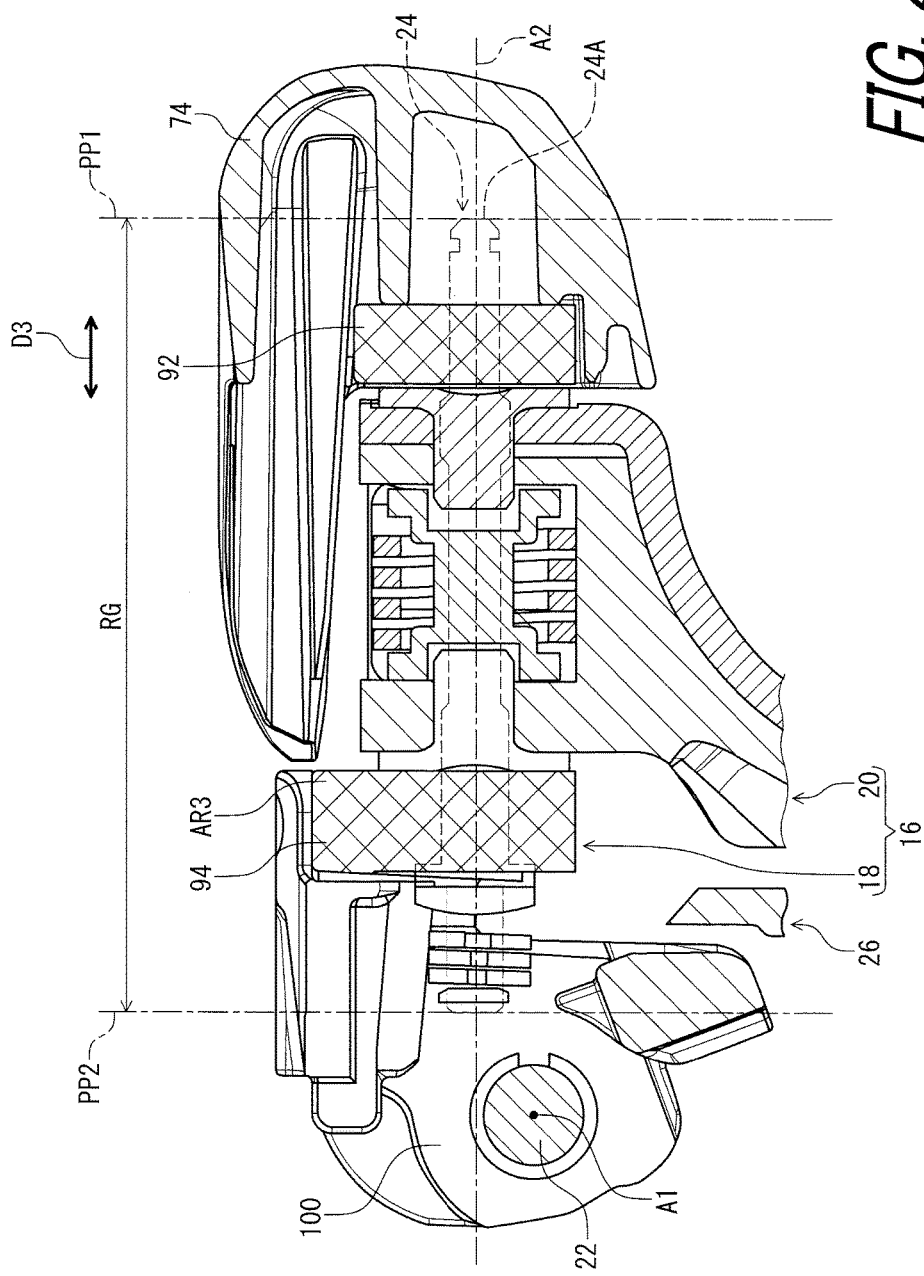
FIG. 21 is a cross-sectional view of the bicycle operating device taken along line XXI-XXI of FIG. 14.

As seen in FIG. 21, the adapter 18 includes a second cross sectional area AR3 defined on a second cross sectional plane CP3 perpendicular to the pivot axis A1. The second cross sectional area AR3 is offset from the center cross sectional area AR1 in the second direction D4. The second cross sectional area AR3 is defined between the first perpendicular plane PP1 and the second perpendicular plane PP2 in the first direction D3. The second cross sectional area AR3 is larger than the center cross sectional area AR1. In this embodiment, the adapter body 96 includes the second cross sectional area AR3. The second cross sectional area AR3 is indicated with a cross-hatching.

Figure 22:
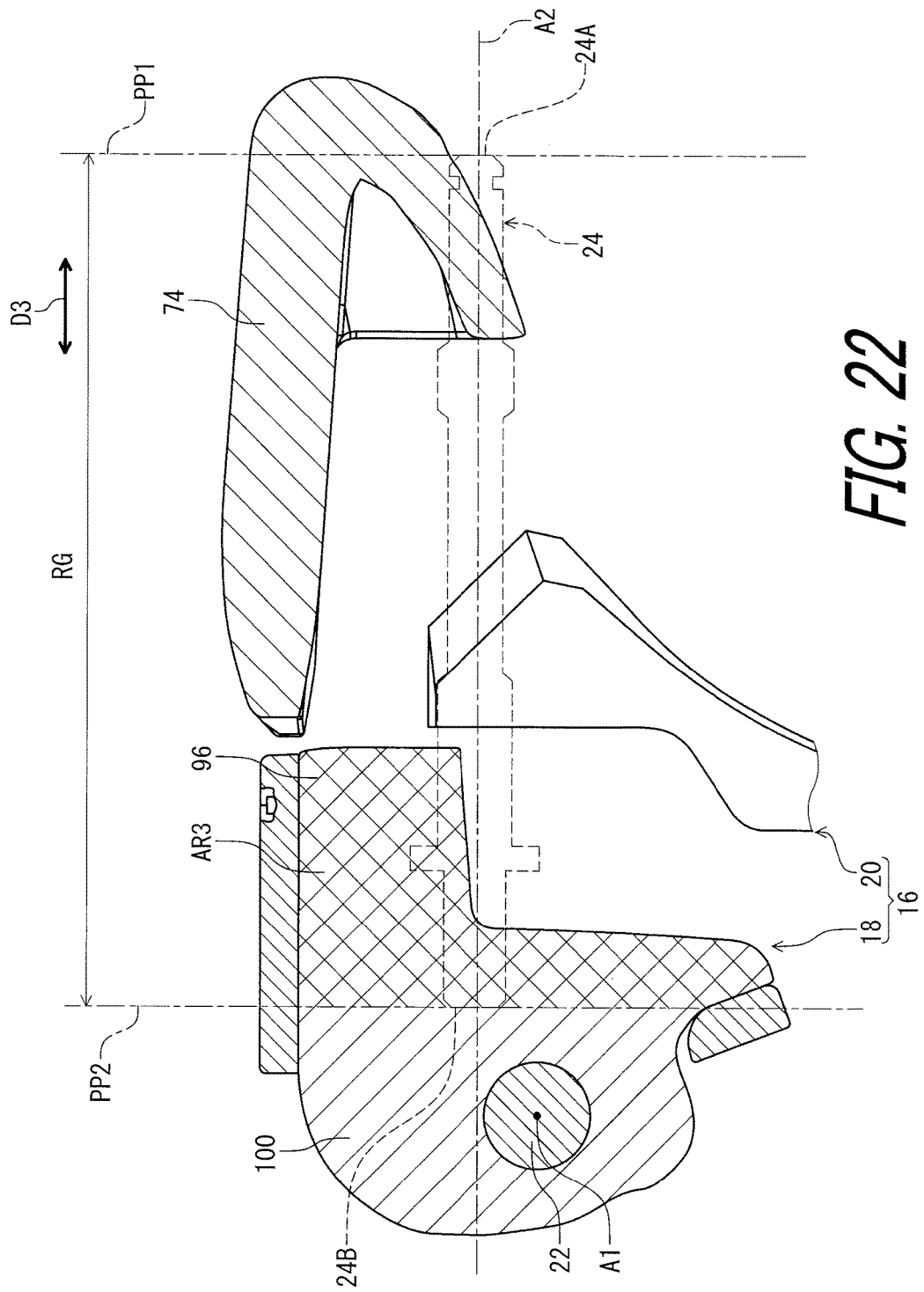
FIG. 22 is a cross-sectional view of the bicycle operating device taken along line XXII-XXII of FIG. 14.

As seen in FIG. 14, the second cross sectional plane CP3 can be defined at positions other than the position corresponding to FIG. 21. For example, the second cross sectional plane CP3' can be defined at a position indicated in FIG. 14. As seen in FIG. 22 corresponding to the second cross sectional plane CP3', the second cross sectional area AR3 is smaller than the first cross sectional areas AR2 illustrated in FIGS. 19 and 20. The second cross sectional area AR3 does not include a cross sectional area of the fourth coupling part 100 provided outside of the region RG.

Figure 23:
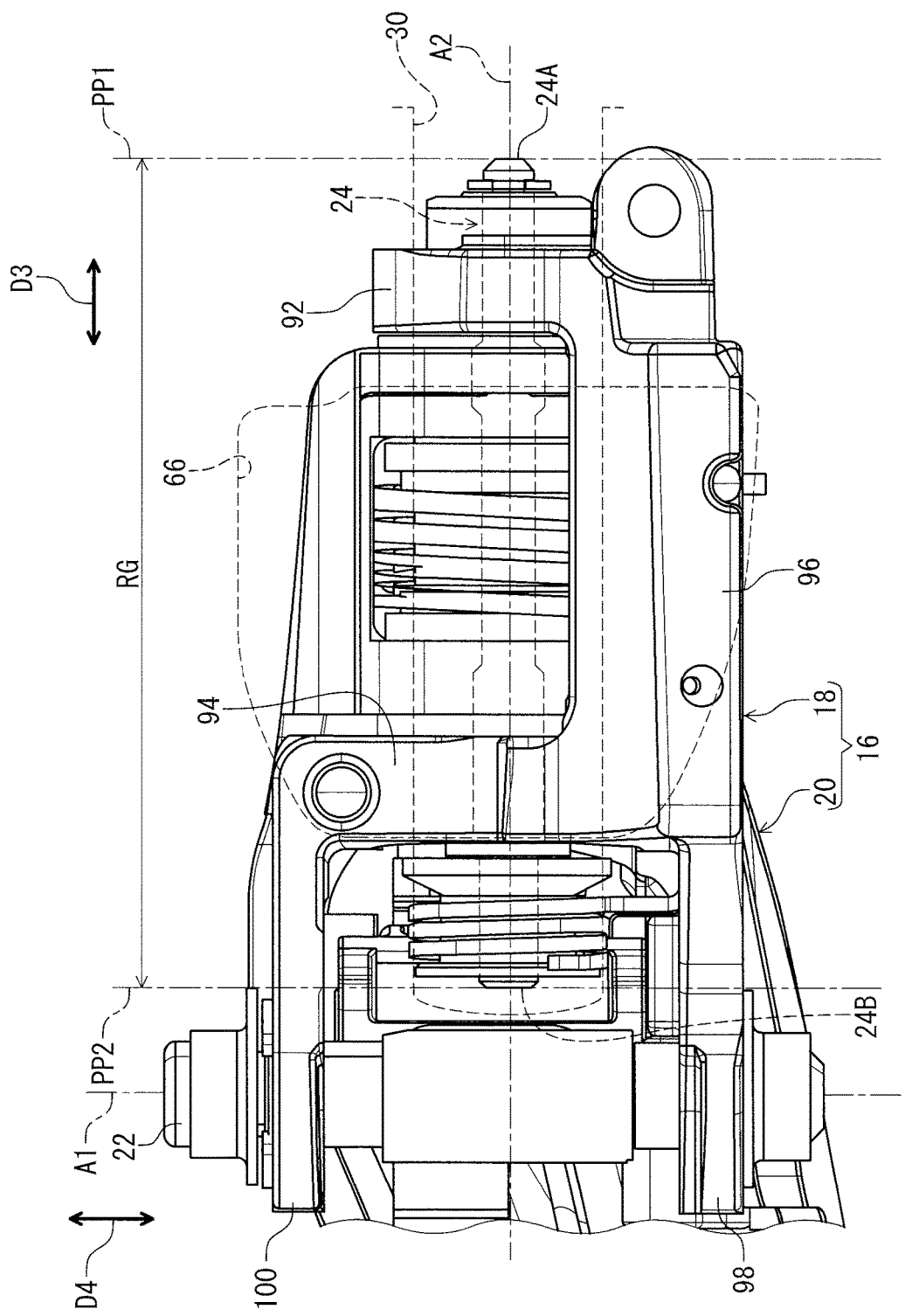
FIG. 23 is a plan view of the operating member of the bicycle operating device illustrated in FIG. 1, with the adapter cover omitted.

As seen in FIG. 23, at least one of the cylinder bore 30 and the reservoir recess 66 at least partly overlaps with the operating shaft 24 when viewed in the third direction D5 (FIG. 16) perpendicular to each of the first direction D3 and the second direction D4. In this embodiment, the cylinder bore 30 at least partly overlaps with the operating shaft 24 when viewed in the third direction D5 perpendicular to each of the first direction D3 and the second direction D4. The cylinder bore 30 partly overlaps with the operating shaft 24 when viewed in the third direction D5. However, the cylinder bore 30 can entirely overlap with the operating shaft 24 when viewed in the third direction D5. The reservoir recess 66 at least partly overlaps with the operating shaft 24 when viewed in the third direction D5. In this embodiment, the reservoir recess 66 partly overlaps with the operating shaft 24 when viewed in the third direction D5. However, the reservoir recess 66 can entirely overlap with the operating shaft 24 when viewed in the third direction D5.

Figure 24:
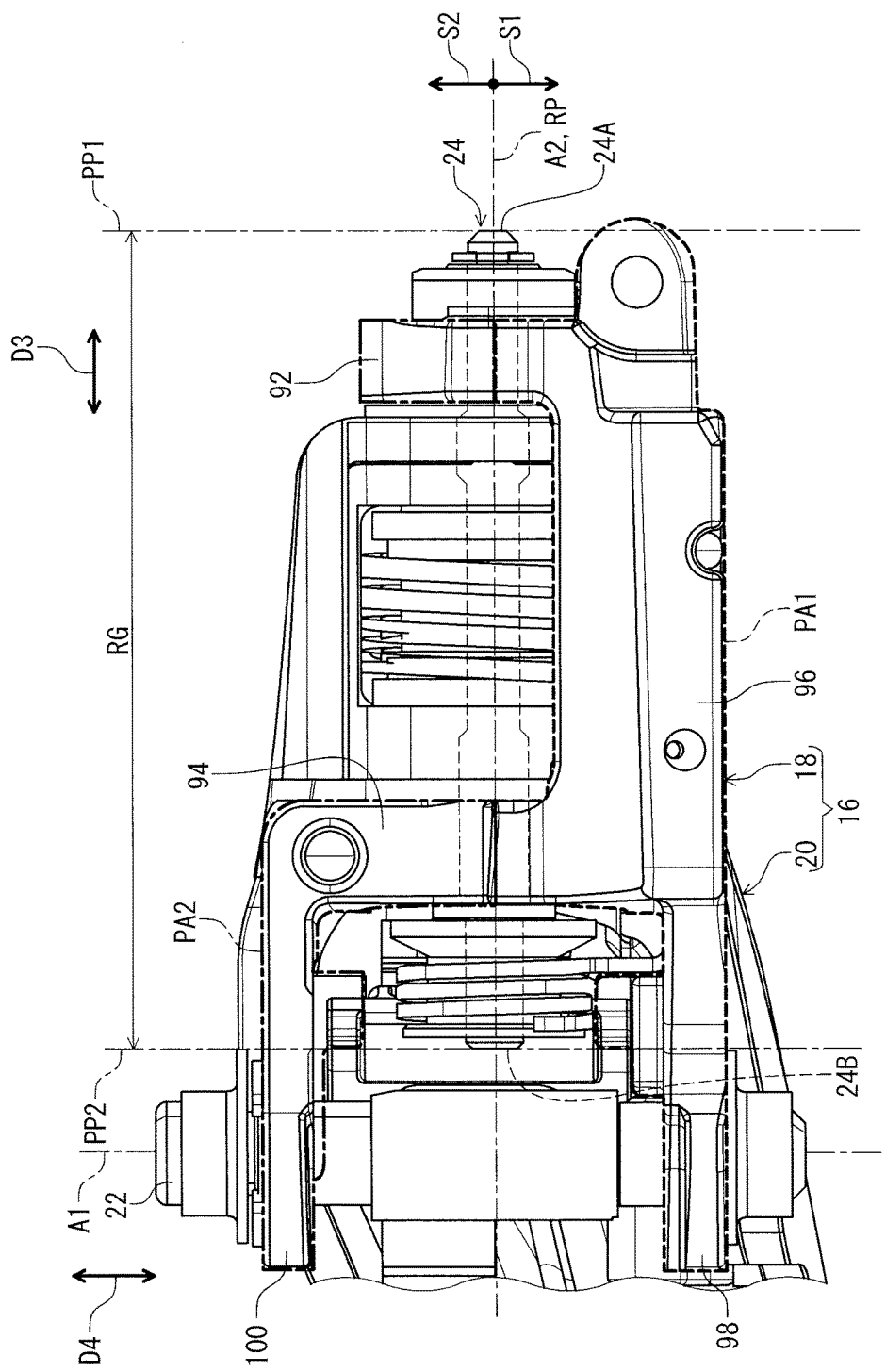
FIG. 24 is a plan view of the operating member of the bicycle operating device illustrated in FIG. 1, with the adapter cover omitted.

As seen in FIG. 24, the adapter 18 includes a first projected area PA1 provided on a first side S1 relative to a reference plane RP when viewed in a reference direction D6 (FIG. 16) perpendicular to each of the pivot axis A1 and the additional pivot axis A2. In this embodiment, as seen in FIG. 16, the reference direction D6 coincides with the third direction D5. The reference plane RP is defined to be perpendicular to the pivot axis A1 and to coincide with the additional pivot axis A2 when viewed in the reference direction D6. The adapter 18 includes a second projected area PA2 provided on a second side S2 relative to the reference plane RP when viewed in the reference direction D6. The second side S2 is opposite to the first side S1 relative to the reference plane RP when viewed in the reference direction D6. The first projected area PA1 is larger than the second projected area PA2. In FIG. 24, the first projected area PA1 is indicated with a broken line, and the second projected area PA2 is indicated with a chain line.

The adapter body 96 is provided on the first side S1 relative to the reference plane RP when viewed in the reference direction D6. At least one of the first coupling part 92 and the second coupling part 94 extends from the first side S1 to the second side S2 beyond the reference plane RP when viewed in the reference direction D6. In this embodiment, the first coupling part 92 and the second coupling part 94 extend from the first side S1 to the second side S2 beyond the reference plane RP when viewed in the reference direction D6.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
   a base member; and
   an operating member including
      an adapter pivotally coupled to the base member about one of a pivot axis and an additional pivot axis non-parallel to the pivot axis,
      an operating lever pivotally coupled to the adapter about the other of the pivot axis and the additional pivot axis, and
      an operating shaft pivotally coupling the operating lever to the adapter, the operating shaft including a first shaft end and a second shaft end, the operating shaft extending between the first shaft end and the second shaft end in a first direction parallel to the additional pivot axis, a first perpendicular plane being perpendicular to the additional pivot axis and defined at the first shaft end, a second perpendicular plane being perpendicular to the additional pivot axis and defined at the second shaft end,
   the adapter including
      a center cross sectional area defined on a center cross sectional plane perpendicular to the pivot axis, the center cross sectional plane being defined on the additional pivot axis when viewed in the first direction, the center cross sectional area being defined between the first perpendicular plane and the second perpendicular plane in the first direction, and
      a first cross sectional area defined on a first cross sectional plane perpendicular to the pivot axis, the first cross sectional area being offset from the center cross sectional area in a second direction parallel to the pivot axis, the first cross sectional area being defined between the first perpendicular plane and the second perpendicular plane in the first direction, the first cross sectional area being larger than the center cross sectional area, wherein
   the adapter includes
      a first coupling part including a first hole, the operating shaft extending through the first hole,
      a second coupling part including a second hole, the second coupling part being spaced apart from the first coupling part, the operating shaft extending through the second hole, and
      an adapter body coupling the first coupling part to the second coupling part, and the adapter body includes the first cross sectional area.

2. The bicycle operating device according to claim 1, wherein
   the first direction is perpendicular to the second direction.

3. The bicycle operating device according to claim 1, wherein
   the base member includes a cylinder bore, and
   the cylinder bore at least partly overlaps with the operating shaft when viewed in a third direction perpendicular to each of the first direction and the second direction.

4. The bicycle operating device according to claim 1, wherein
   the base member includes a cylinder bore and a reservoir bore, and
   at least one of the cylinder bore and the reservoir bore at least partly overlaps with the operating shaft when viewed in a third direction perpendicular to each of the first direction and the second direction.

5. The bicycle operating device according to claim 1, wherein
   the adapter body extends in the first direction.

6. The bicycle operating device according to claim 1, wherein
   the first coupling part extends from the adapter body in the second direction.

7. The bicycle operating device according to claim 6, wherein
   the second coupling part extends from the adapter body in the second direction.

8. The bicycle operating device according to claim 1, wherein
   at least one of the first coupling part and the second coupling part is provided between the first perpendicular plane and the second perpendicular plane.

9. The bicycle operating device according to claim 1, wherein
   the operating lever includes a first lever end provided between the first coupling part and the second coupling part.

10. The bicycle operating device according to claim 1, wherein
    the adapter body is offset from the additional pivot axis without overlapping with the additional pivot axis when viewed in a third direction perpendicular to each of the first direction and the second direction.

11. The bicycle operating device according to claim 1, wherein
the adapter is integrally provided as a one-piece unitary member.

12. The bicycle operating device according to claim 1, wherein
the base member includes
a first end portion configured to be coupled to a bicycle handlebar in a mounting state where the bicycle operating device is mounted to the bicycle handlebar, and
a second end portion opposite to the first end portion, and
the operating member is provided between the first end portion and the second end portion.

13. The bicycle operating device according to claim 12, wherein
the first end portion includes a mounting surface having a curved shape corresponding to a drop-down handlebar.

14. The bicycle operating device according to claim 12, wherein
the base member includes a grip portion arranged between the first end portion and the second end portion.

15. The bicycle operating device according to claim 12, wherein
the second end portion includes a pommel portion.

16. A bicycle operating device comprising:
a base member; and
an operating member including
an adapter pivotally coupled to the base member about one of a pivot axis and an additional pivot axis non-parallel to the pivot axis, and
an operating lever pivotally coupled to the adapter about the other of the pivot axis and the additional pivot axis,
the adapter including
a first projected area provided on a first side relative to a reference plane when viewed in a reference direction perpendicular to each of the pivot axis and the additional pivot axis, the reference plane being defined to be perpendicular to the pivot axis and to coincide with the additional pivot axis when viewed in the reference direction, and
a second projected area provided on a second side relative to the reference plane when viewed in the reference direction, the second side being opposite to the first side relative to the reference plane when viewed in the reference direction, the first projected area being larger than the second projected area, wherein
the adapter includes
a first coupling part,
a second coupling part spaced apart from the first coupling part in a first direction parallel to the additional pivot axis, and
an adapter body coupling the first coupling part to the second coupling part, and
the adapter body is provided entirely on the first side relative to the reference plane when viewed in the reference direction for at least a portion of a length of the adapter body along the additional pivot axis.

17. The bicycle operating device according to claim 16, wherein
at least one of the first coupling part and the second coupling part extends from the first side to the second side beyond the reference plane when viewed in the reference direction.

\* \* \* \* \*